(12) United States Patent
Xu et al.

(10) Patent No.: US 11,304,060 B2
(45) Date of Patent: Apr. 12, 2022

(54) NETWORK RESOURCE DEPLOYMENT METHOD AND DEVICE, AND NETWORK RESOURCE ASSESSMENT METHOD AND DEVICE

(71) Applicant: HUAWEI TECHNOLOGIES CO., LTD., Guangdong (CN)

(72) Inventors: Ruiyue Xu, Shanghai (CN); Kai Zhang, Shanghai (CN); Yan Li, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/832,721

(22) Filed: Mar. 27, 2020

(65) Prior Publication Data

US 2020/0228990 A1 Jul. 16, 2020

Related U.S. Application Data

(63) Continuation of application No. PCT/CN2018/103093, filed on Aug. 29, 2018.

(30) Foreign Application Priority Data

Sep. 30, 2017 (CN) .......................... 201710922482.X

(51) Int. Cl.
*H04W 16/02* (2009.01)
*H04W 16/18* (2009.01)

(52) U.S. Cl.
CPC ........... *H04W 16/02* (2013.01); *H04W 16/18* (2013.01)

(58) Field of Classification Search
CPC ..... H04W 16/02; H04W 16/18; H04W 24/02; H04W 4/08; H04W 48/18; H04W 36/26;
(Continued)

(56) References Cited

U.S. PATENT DOCUMENTS 10,284,495 B2 * 5/2019 Shimojou ............... H04L 47/82
2011/0126060 A1 * 5/2011 Grube ................. G06F 11/1088
714/48
(Continued)

FOREIGN PATENT DOCUMENTS

CN 106572517 A 4/2017
CN 106657194 A 5/2017
(Continued)

OTHER PUBLICATIONS

"3rd Generation Partnership Project; Technical Specification GroupServices and System Aspects; Telecommunication management;Study on management and orchestration of network slicing for nextgeneration network (Release 15)", 3GPP Standard;Technical Report;3GPP TR 28.801, vol. SA WG5, No. V15.0.0, Sep. 25, 2017, pp. 1 78, XP051337191.
(Continued)

*Primary Examiner* — Jung Liu
(74) *Attorney, Agent, or Firm* — Womble Bond Dickinson (US) LLP

(57) ABSTRACT

A network resource deployment method relate to the field of communications technologies. The network resource deployment method includes: A first device receives a target network management request; then determines requirement information of a to-be-deployed network resource required for managing a target network; and finally sends a network resource management request to a second device. After receiving the network resource management request, the second device deploys the to-be-deployed network resource. The target network management request includes target network requirement information. The requirement information of the to-be-deployed network resource includes at least one of air interface resource requirement information, user quantity requirement information, throughput requirement information, coverage requirement information, radio bearer
(Continued)

RB requirement information, base station requirement information, network element device requirement information, and network function requirement information. The network resource management request includes the requirement information of the to-be-deployed network resource.

22 Claims, 9 Drawing Sheets

(58) Field of Classification Search
CPC ....... H04W 4/005; H04W 4/70; H04W 12/06; H04W 12/08; H04W 12/61; H04W 4/50; H04W 12/63; H04L 29/08; H04L 41/12; H04L 67/1044; H04L 41/0893; H04L 63/105; H04L 41/0896; H04L 63/0815
See application file for complete search history.

(56) References Cited

U.S. PATENT DOCUMENTS

| | | | | |
|---|---|---|---|---|
| 2014/0324931 | A1* | 10/2014 | Grube | G06F 11/1092 707/828 |
| 2014/0325224 | A1* | 10/2014 | Grube | H04L 9/32 713/168 |
| 2017/0141973 | A1 | 5/2017 | Vrzic | |
| 2017/0208019 | A1* | 7/2017 | Shimojou | H04L 41/0896 |
| 2017/0264535 | A1* | 9/2017 | Choi | H04L 12/4641 |
| 2018/0302877 | A1* | 10/2018 | Bosch | H04W 76/10 |
| 2018/0332441 | A1* | 11/2018 | Shaw | H04L 67/1044 |
| 2019/0037446 | A1* | 1/2019 | Dowlatkhah | H04W 28/0289 |
| 2019/0045351 | A1* | 2/2019 | Zee | H04W 48/18 |
| 2019/0357129 | A1* | 11/2019 | Park | H04W 60/00 |
| 2020/0275356 | A1* | 8/2020 | Forsman | H04L 41/0803 |

FOREIGN PATENT DOCUMENTS

| | | |
|---|---|---|
| CN | 106792739 A | 5/2017 |
| WO | 2017023196 A1 | 2/2017 |
| WO | 2017113109 A1 | 7/2017 |
| WO | 2017154728 A1 | 9/2017 |

OTHER PUBLICATIONS

Huawei, Complete requirements for use case 5.1.6.6. 3GPP TSG SA WG5(Telecom Management) Meeting #113, May 8-12, 2017, West Palm Beach, Florida (US), S5-173439, 5 pages.

* cited by examiner

NETWORK RESOURCE DEPLOYMENT METHOD AND DEVICE, AND NETWORK RESOURCE ASSESSMENT METHOD AND DEVICE

CROSS-REFERENCE TO RELATED APPLICATIONS

This application is a continuation of International Application No. PCT/CN2018/103093, filed on Aug. 29, 2018, which claims priority to Chinese Patent Application No. 201710922482.X, filed on Sep. 30, 2017. The disclosures of the aforementioned applications are hereby incorporated by reference in their entireties.

TECHNICAL FIELD

This application relates to the field of communications technologies, and in particular, to a network resource deployment method and device, and a network resource assessment method and device.

BACKGROUND

A network slice technology is introduced into a new generation communications system. By using the technology, a network may be divided into a plurality of logically independent network slices, and each network slice may serve a service in a particular scenario, thereby greatly improving network flexibility.

To satisfy requirements of different services, a mechanism of automatically deploying a network slice is introduced. However, in the prior art, a network slice is deployed by obtaining a network resource (for example, a resource such as an air interface resource or a device resource) that is already deployed in an existing network; but if the network resource that is already deployed in the existing network cannot satisfy a requirement of deploying the network slice, the network slice fails to be deployed. Consequently, user experience is reduced.

SUMMARY

Embodiments of this application provide a network resource deployment method and device, and a network resource assessment method and device, to help improve a possibility of successful network slice deployment.

According to a first aspect, a network resource deployment method according to an embodiment of this application includes:

receiving, by a first device, a target network management request; then determining, based on target network requirement information, requirement information of a to-be-deployed network resource required for managing a target network, and finally sending a network resource management request to a second device, where the target network management request includes the target network requirement information; the requirement information of the to-be-deployed network resource includes at least one of air interface resource requirement information, user quantity requirement information, throughput requirement information, coverage requirement information, radio bearer RB requirement information, base station requirement information, network element device requirement information, and network function requirement information; and the network resource management request includes the requirement information of the to-be-deployed network resource.

In this embodiment of this application, after determining the requirement information of the to-be-deployed network resource, the first device may send the network resource management request to the second device to deploy the network resource, so that on-demand deployment is implemented, thereby helping improve a possibility of successful target network deployment, and also helps improve network resource utilization.

To simplify an implementation in which the first device determines the requirement information of the to-be-deployed network resource required for managing the target network, specifically, in one embodiment, the first device determines, based on the target network requirement information, requirement information of one or more network resources required for managing the target network; and determines the requirement information of the to-be-deployed network resource based on the requirement information of the one or more network resources required for managing the target network and instance information of a network resource already deployed in an existing network.

In one embodiment, the first device sends a network resource query request to the second device, where the network resource query request includes the requirement information of the one or more network resources required for managing the target network; and then receives a network resource query result sent by the second device, where the network resource query result includes the instance information of the network resource already deployed in the existing network. The foregoing manner helps the first device obtain the instance information of the network resource already deployed in the existing network.

In one embodiment, the first device receives a network resource management notification sent by the second device, where the network resource management notification includes at least one of indication information and instance information of the to-be-deployed network resource, and the indication information indicates whether the to-be-deployed network resource is successfully deployed; and if determining that the to-be-deployed network resource is successfully deployed, the first device manages the target network; or if determining that the to-be-deployed network resource fails to be deployed, the first device returns a target network management request failure. The foregoing technical solution helps the first device obtain a deployment result of the to-be-deployed network resource.

In one embodiment, the instance information of the network resource already deployed in the existing network includes at least one of a network resource identifier, a quantity of users supported by the network resource, a throughput supported by the network resource, coverage supported by the network resource, a capacity of the network resource, and a quantity of RBs supported by the network resource.

In one embodiment, the first device is a network slice management unit or a network slice subnet management unit; and the second device is a network management unit or an element management unit.

According to a second aspect, a network resource deployment method according to an embodiment of this application includes:

after receiving a network resource management request sent by a first device, deploying, by a second device, a to-be-deployed network resource, where the network resource management request includes requirement information of the to-be-deployed network resource; and the requirement information of the to-be-deployed network resource includes at least one of air interface resource requirement information, user quantity requirement information, throughput requirement information, coverage requirement information, radio bearer requirement information, base station requirement information, network element device requirement information, and network function requirement information.

In this embodiment of this application, the second device can deploy the to-be-deployed network resource based on the network resource management request sent by the first device, to help implement on-demand deployment, improve a possibility of successful target network deployment, and improve network resource utilization.

To help the first device obtain a deployment result of the to-be-deployed network resource, in one embodiment, the second device sends a network resource management notification to the first device, where the network resource management notification includes at least one of indication information and instance information of the to-be-deployed network resource, and the indication information indicates whether the to-be-deployed network resource is successfully deployed.

In addition, in this embodiment of this application, after receiving a network resource query request sent by the first device, the second device may further send a network resource query result to the first device, so that the first device obtains instance information of a network resource already deployed in an existing network. The network resource query request includes requirement information of one or more network resources required for managing a target network, and the network resource query result includes the instance information of the network resource already deployed in the existing network.

In one embodiment, after the second device receives the network resource query request sent by the first device, if determining that the network resource already deployed in the existing network cannot satisfy the requirement information of the one or more network resources required for managing the target network, the second device sends the network resource query result to the first device, where the network resource query result includes the instance information of the network resource already deployed in the existing network; or if determining that the network resource already deployed in the existing network can satisfy the requirement information of the one or more network resources required for managing the target network, the second device sends the network resource query result to the first device, where the network resource query result includes identification information used to indicate the network resource that is already deployed in the existing network and that can satisfy the requirement information of the one or more network resources required for managing the target network.

According to a third aspect, a network resource assessment method according to an embodiment of this application includes:

receiving, by a first device, a network pre-assessment request sent by a second device; and then sending a network pre-assessment response to the second device, where the network pre-assessment request includes network requirement information, and the network requirement information indicates a requirement satisfied by a network that needs to be deployed; and the network pre-assessment response includes indication information, and the indication information indicates whether the network can be provided in an existing network.

In this embodiment of this application, the first device can pre-assess, by sending the network pre-assessment request to the second device, whether the network can be provided in the existing network, thereby helping improve a possibility that the first device successfully deploys the network.

In one embodiment, the network pre-assessment response further includes requirement information of a to-be-deployed network resource; and the requirement information of the to-be-deployed network resource includes at least one of air interface resource requirement information, user quantity requirement information, throughput requirement information, coverage requirement information, radio bearer RB requirement information, base station requirement information, network element device requirement information, and network function requirement information. According to the foregoing technical solution, the second device can obtain the requirement information of the to-be-deployed network resource, thereby facilitating subsequent deployment of the to-be-deployed network resource.

In one embodiment, if the indication information indicates that the network can be provided in the existing network, after sending the network pre-assessment response to the second device, the first device receives a network deployment request sent by the second device, and the network deployment request is used to instruct to deploy the network. The foregoing technical solution helps implement rapid deployment of the network.

In one embodiment, if determining that the network can be provided in the existing network, the first device reserves a network resource corresponding to the network in the existing network, and then sends the network pre-assessment response to the second device. The foregoing technical solution helps improve the possibility of successful network deployment. To simplify a process in which the second device determines to reserve the corresponding network resource in the existing network, in one embodiment, the first device allocates a network resource identifier to the reserved network resource corresponding to the network in the existing network. The network pre-assessment response further includes the network resource identifier, and the network resource identifier is used to identify the network resource corresponding to the network in the existing network.

In one embodiment, the network deployment request includes the network resource identifier.

According to a fourth aspect, a network resource assessment method according to an embodiment of this application includes:

after sending a network pre-assessment request to a first device, receiving, by a second device, a network pre-assessment response sent by the first device, where the network pre-assessment request includes network requirement information, and the network requirement information indicates a requirement satisfied by a network that needs to be deployed; and the network pre-assessment response includes indication information, and the indication information indicates whether the network can be provided in an existing network.

In this embodiment of this application, the second device can pre-assess, by sending the network pre-assessment request to the first device, whether the network can be provided in the existing network, thereby helping improve a possibility that the first device successfully deploys the network.

In one embodiment, after receiving the network pre-assessment response sent by the first device, if determining that the indication information indicates that the network can be provided in the existing network, the second device sends a network deployment request to the first device; or if determining that the indication information indicates that the network cannot be provided in the existing network, the second device sends a network resource deployment request to the first device.

In one embodiment, the network pre-assessment response further includes requirement information of a to-be-deployed network resource; and the requirement information of the to-be-deployed network resource includes at least one of air interface resource requirement information, user quantity requirement information, throughput requirement information, coverage requirement information, radio bearer RB requirement information, base station requirement information, network element device requirement information, and network function requirement information. According to the foregoing technical solution, the second device can obtain the requirement information of the to-be-deployed network resource, thereby facilitating subsequent deployment of the to-be-deployed network resource.

According to a fifth aspect, a first device for network resource deployment according to an embodiment of this application includes a transceiver module and a processing module. The transceiver module is configured to receive a target network management request, and the target network management request includes target network requirement information. The processing module is configured to determine, based on the target network requirement information, requirement information of a to-be-deployed network resource required for managing a target network; and the requirement information of the to-be-deployed network resource includes at least one of air interface resource requirement information, user quantity requirement information, throughput requirement information, coverage requirement information, radio bearer RB requirement information, base station requirement information, network element device requirement information, and network function requirement information. The transceiver module is further configured to send a network resource management request to a second device, and the network resource management request includes the requirement information of the to-be-deployed network resource.

In one embodiment, the processing module is specifically configured to: determine, based on the target network requirement information, requirement information of one or more network resources required for managing the target network; and determine the requirement information of the to-be-deployed network resource based on the requirement information of the one or more network resources required for managing the target network and instance information of a network resource already deployed in an existing network.

In one embodiment, the transceiver module is further configured to: send a network resource query request to the second device, where the network resource query request includes the requirement information of the one or more network resources required for managing the target network; and receive a network resource query result sent by the second device, where the network resource query result includes the instance information of the network resource already deployed in the existing network.

In one embodiment, the transceiver module is further configured to receive a network resource management notification sent by the second device, where the network resource management notification includes at least one of indication information and instance information of the to-be-deployed network resource, and the indication information indicates whether the to-be-deployed network resource is successfully deployed; and the processing module is further configured to: if determining that the to-be-deployed network resource is successfully deployed, manage the target network; or if determining that the to-be-deployed network resource fails to be deployed, return a target network management request failure.

In one embodiment, the instance information of the network resource already deployed in the existing network includes at least one of a network resource identifier, a quantity of users supported by the network resource, a throughput supported by the network resource, coverage supported by the network resource, a capacity of the network resource, and a quantity of RBs supported by the network resource.

In one embodiment, the first device is a network slice management unit or a network slice subnet management unit; and the second device is a network management unit or an element management unit.

It should be noted that, according to one embodiment, the processing module corresponds to a processor in a hardware device, and the transceiver module corresponds to a transceiver in the hardware module.

According to another aspect, an embodiment of this application further provides a first device, including a processor, a transceiver, and a memory. The memory is configured to store a program instruction and information that is sent and received by the transceiver. The processor is configured to execute the program instruction stored in the memory, to implement the technical solution according to any one of the embodiments of this application.

According to still another aspect, an embodiment of this application further provides a computer storage medium, configured to store a program of the technical solution according to any one of the first aspect or the embodiments of the first aspect.

According to yet another aspect, an embodiment of this application provides a chip. The chip is coupled to a transceiver in a first device, and is configured to perform the technical solution according to any one of the first aspect or the embodiments of the first aspect of the embodiments of this application. It should be understood that "coupled" in this embodiment of this application means that two components are directly or indirectly combined with each other. The combination may be fixed or movable, and the combination may allow communication of fluid, electricity, an electrical signal, or another type of signal between the two components.

According to a sixth aspect, a second device for network resource deployment according to an embodiment of this application includes a processing module and a transceiver module. The transceiver module is configured to receive a network resource management request sent by a first device. The processing module is configured to: after the transceiver module receives the network resource management request sent by the first device, deploy a to-be-deployed network resource. The network resource management request includes requirement information of the to-be-deployed network resource; and the requirement information of the to-be-deployed network resource includes at least one of air interface resource requirement information, user quantity requirement information, throughput requirement information, coverage requirement information, radio bearer requirement information, base station requirement information, network element device requirement information, and network function requirement information.

In one embodiment, the transceiver module is further configured to send a network resource management notification to the first device, where the network resource management notification includes at least one of indication information and instance information of the to-be-deployed network resource, and the indication information indicates whether the to-be-deployed network resource is successfully deployed.

In one embodiment, the transceiver module is further configured to: after receiving a network resource query request sent by the first device, send a network resource query result to the first device. The network resource query request includes requirement information of one or more network resources required for managing a target network, and the network resource query result includes instance information of a network resource already deployed in an existing network.

It should be noted that, according to any one of the sixth aspect and the embodiments of the sixth aspect, the processing module corresponds to a processor in a hardware device, and the transceiver module corresponds to a transceiver in the hardware module.

According to another aspect, an embodiment of this application further provides a second device, including a processor, a transceiver, and a memory. The memory is configured to store a program instruction and information that is sent and received by the transceiver. The processor is configured to execute the program instruction stored in the memory, to implement the technical solution according to any one of the second aspect or the embodiments of this application.

According to still another aspect, an embodiment of this application further provides a computer storage medium, configured to store a program of the technical solution according to any one of the second aspect or the embodiments of the second aspect.

According to yet another aspect, an embodiment of this application provides a chip. The chip is coupled to a transceiver in a second device, and is configured to perform the technical solution according to any one of the second aspect or the embodiments of this application. It should be understood that "coupled" in this embodiment of this application means that two components are directly or indirectly combined with each other. The combination may be fixed or movable, and the combination may allow communication of fluid, electricity, an electrical signal, or another type of signal between the two components.

According to a seventh aspect, a communications system according to an embodiment of this application includes the first device according to any one of the fifth aspect or the embodiments of this application and the second device according to any one of the embodiments of this application.

According to an eighth aspect, a first device for network resource assessment according to an embodiment of this application includes a receiving module and a sending module. The receiving module is configured to receive a network pre-assessment request sent by a second device, where the network pre-assessment request includes network requirement information, and the network requirement information indicates a requirement satisfied by a network that needs to be deployed. The sending module is configured to send a network pre-assessment response to the second device, where the network pre-assessment response includes indication information, and the indication information indicates whether the network can be provided in an existing network.

In one embodiment, the network pre-assessment response further includes requirement information of a to-be-deployed network resource; and the requirement information of the to-be-deployed network resource includes at least one of air interface resource requirement information, user quantity requirement information, throughput requirement information, coverage requirement information, radio bearer RB requirement information, base station requirement information, network element device requirement information, and network function requirement information.

In one embodiment, if the indication information indicates that the network can be provided in the existing network, the receiving module is further configured to: after the sending module sends the network pre-assessment response to the second device, receive a network deployment request sent by the second device, where the network deployment request is used to instruct to deploy the network.

In one embodiment, a processing module in the first device is configured to: before the sending module sends the network pre-assessment response to the second device, if determining that the network can be provided in the existing network, reserve a network resource corresponding to the network in the existing network.

In one embodiment, the network pre-assessment response further includes a network resource identifier, and the network resource identifier is used to identify the network resource corresponding to the network in the existing network.

In one embodiment, the network deployment request includes the network resource identifier.

In one embodiment, the processing module corresponds to a processor in a hardware device, and the receiving module and the sending module correspond to a transceiver in the hardware module.

According to another aspect, an embodiment of this application further provides a first device, including a processor, a transceiver, and a memory. The memory is configured to store a program instruction and information that is sent and received by the transceiver. The processor is configured to execute the program instruction stored in the memory, to implement the technical solution according to any one of the embodiments of this application.

According to still another aspect, an embodiment of this application further provides a computer storage medium, configured to store a program of the technical solution according to any one of the embodiments of this application.

According to yet another aspect, an embodiment of this application provides a chip. The chip is coupled to a transceiver in a first device, and is configured to perform the technical solution according to any one of the embodiments of this application. It should be understood that "coupled" in this embodiment of this application means that two components are directly or indirectly combined with each other. The combination may be fixed or movable, and the combination may allow communication of fluid, electricity, an electrical signal, or another type of signal between the two components.

According to a ninth aspect, a second device for network resource assessment according to an embodiment of this application includes a sending module and a receiving module. The sending module is configured to send a network pre-assessment request to a first device. The receiving module is configured to: after the sending module sends the network pre-assessment request to the first device, receive a network pre-assessment response sent by the first network device. The network pre-assessment request includes network requirement information, and the network requirement information indicates a requirement satisfied by a network that needs to be deployed. The network pre-assessment response includes indication information, and the indication information indicates whether the network can be provided in an existing network.

In one embodiment, a processing module in the second device is further configured to: after the receiving module receives the network pre-assessment response sent by the first device, if determining that the indication information indicates that the network can be provided in the existing network, trigger the sending module to send a network deployment request to the first device; or if determining that the indication information indicates that the network cannot be provided in the existing network, trigger the sending module to send a network resource deployment request to the first device.

In one embodiment, the network pre-assessment response further includes requirement information of a to-be-deployed network resource; and the requirement information of the to-be-deployed network resource includes at least one of air interface resource requirement information, user quantity requirement information, throughput requirement information, coverage requirement information, radio bearer RB requirement information, base station requirement information, network element device requirement information, and network function requirement information. According to the foregoing technical solution, the second device can obtain the requirement information of the to-be-deployed network resource, thereby facilitating subsequent deployment of the to-be-deployed network resource.

It should be noted that, in one embodiment, the processing module corresponds to a processor in a hardware device, and the receiving module and the sending module correspond to a transceiver in the hardware module.

According to another aspect, an embodiment of this application further provides a second device, including a processor, a transceiver, and a memory. The memory is configured to store a program instruction and information that is sent and received by the transceiver. The processor is configured to execute the program instruction stored in the memory, to implement the technical solution according to any one of the embodiments of this application.

According to still another aspect, an embodiment of this application further provides a computer storage medium, configured to store a program of the technical solution according to any one of the embodiments of this application.

According to yet another aspect, an embodiment of this application provides a chip. The chip is coupled to a transceiver in a second device, and is configured to perform the technical solution according to any one of the embodiments of this application. It should be understood that "coupled" in this embodiment of this application means that two components are directly or indirectly combined with each other. The combination may be fixed or movable, and the combination may allow communication of fluid, electricity, an electrical signal, or another type of signal between the two components.

According to a tenth aspect, a communications system according to an embodiment of this application includes the first device according to any one of the embodiments of this application and the second device according to any one of the embodiments of this application.

DESCRIPTION OF EMBODIMENTS

The embodiments of this application are described in detail below with reference to the accompanying drawings of this specification.

It should be understood that in the embodiments of this application, a first device and a second device may be two physically independent physical devices, or may be two logically independent functional units, and the two functional units may be integrated into one physical device, or may be respectively integrated into two different physical devices. This is not limited in the embodiments of this application. For example, the first device may be a network slice management unit or a network slice subnet management unit; and the second device may be a network management unit or an element management unit.

In the embodiments of this application, the network slice management unit may also be referred to as a network slice management function, NSMF for short; the network slice subnet management unit may also be referred to as a network slice subnet management function, NSSMF for short; the network management unit may be referred to as a network management, NM for short; and the element management unit may be referred to as an element management, EM for short. It should be noted that in the embodiments of this application, the element management unit may be a domain management (DM), or may be used as a functional module of the DM. This is not limited in the embodiments of this application.

Figure 1A:
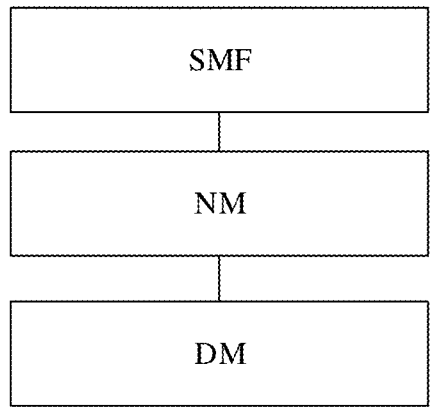
FIG. 1a and FIG. 1b are each a schematic diagram of a communication architecture according to an embodiment of this application.
Figure 1B:
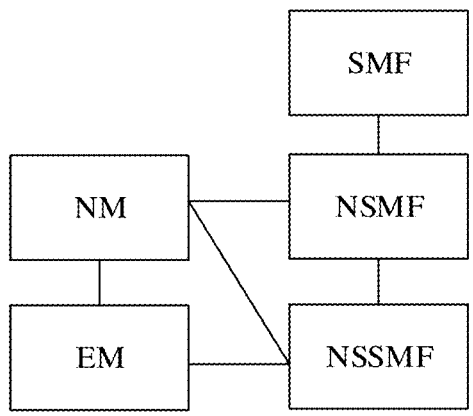

Specifically, the embodiments of this application may be applied to a communications architecture shown in FIG. 1a, or may be applied to a communications architecture shown in FIG. 1b. The communications architecture shown in FIG.

1*a* includes a service management function (SMF), a network management unit, and an element management unit; and a network slice management unit is used as a functional module in the network management unit, and a network slice subnet management unit is used as a functional module in the element management unit. The communications architecture shown in FIG. 1*b* includes an SMF, a network slice management unit, a network slice subnet management unit, a network management unit, and an element management unit. The network slice management unit, the network slice subnet management unit, the network management unit, and the element management unit are independent units.

The SMF is configured to: receive a service requirement of a related user, convert the service requirement into a network slice-related requirement, and perform service-related management. It should be noted that a name of the SMF is not limited in the embodiments of this application. For example, the SMF may also be referred to as a customer service management function or a communication service management function (CSMF). In addition, in the embodiments of this application, the SMF may be an independent management unit, or may be a function in any management unit (for example, a business support system (BSS), a service management unit, a service orchestration unit, or a service management and orchestration unit). It should be further noted that the SMF may be included in an operations support system (OSS), or may not be included in an OSS. In addition, in the embodiments of this application, the SMF may alternatively be a management or operation unit of the user.

In the communications architecture shown in FIG. 1*a:*

The network management unit includes one or both of an end-to-end network management function and an end-to-end network orchestration function. Specifically, the network management unit may have some or all of the following functions:

end-to-end network management (such as network lifecycle management, network template management, network fault management, network performance management, and network configuration management); mapping between an end-to-end network, a subnet, and a network function; coordination of network resources or sub-SLAs provided in different domains (such as an access network domain, a core network domain, and a transmission domain); decomposition of network requirement information into subnet requirement information; uniform orchestration of subnets provided in domains, so that the subnets provided in the different subdomains can satisfy a target service or network requirement (such as a service level agreement (SLA) requirement, a key performance indicator (KPI) requirement, or a quality of service (QoS) requirement); and management of end-to-end network resources (such as network functions, transmission resources, network elements, or air interface resources) (for example, deployment, configuration management, performance management, and fault management of the network resources).

In the embodiments of this application, an end-to-end network may also be referred to as a network slice or an end-to-end (E2E) network slice. Specifically, the end-to-end network includes at least a core network (CN) part, an access network (AN) part, and a transport network (TN) part; or the end-to-end network may include any two of a CN part, an AN part, and a TN part; or the end-to-end network may represent a network of a CN part, a network of an AN part, or a network of a TN part. In the embodiments of this application, the end-to-end network includes at least one network subnet. Logically, a network is a set of network functions. The network subnet herein may also be referred to as a network slice subnet.

It should be noted that a name of the network management unit is not limited in the embodiments of this application. For example, in the embodiments of this application, the network management unit may also be referred to as a cross-domain management unit, a cross-domain network slice management unit, a network slice management unit, or another name.

In the embodiments of this application, the network management unit may be an independent management unit, or may be a function in any management unit (for example, a network orchestration unit, a network management and orchestration unit, a service management unit, a service orchestration unit, a service management and orchestration unit, or a network functions virtualization orchestrator (NFVO). In addition, it should be further noted that the network management unit may be included in an OSS, or may not be included in an OSS.

The domain management unit includes one or both of a subnet management function and an orchestration function. Specifically, the domain management unit may have some or all of the following functions:

domain management (including subnet lifecycle management (creation, update, and deletion), subnet fault management, subnet performance management, subnet configuration management, and the like); service management (including service lifecycle management, service fault management, service performance management, service configuration management, and the like); coordination of network resources (for example, network functions (NF) or network elements (NE); and management of intra-domain network resources (for example, network functions, transmission resources, network elements, or air interface resources) (for example, deployment, configuration management, performance management, and fault management of the network resources).

In this embodiment of this application, a subnet may include one or more of an AN part, a CN part, and a TN part. Specifically, in the embodiments of this application, the subnet may be considered as a network function or a network element. This is not limited.

When a subnet managed by the domain management unit includes only an AN part, the domain management unit may also be referred to as an AN DM. When a subnet managed by the domain management unit includes only a CN part, the domain management unit may also be referred to as a CN DM. When a subnet managed by the domain management unit includes an AN part and a CN part, the domain management unit may be referred to as a mixed domain management unit (mix DM).

It should be noted that a name of the domain management unit is not limited in the embodiments of this application. For example, the domain management unit in the embodiments of this application may also be referred to as a domain slice management unit, a network slice subnet management unit, or the like.

In the embodiments of this application, the domain management unit may be an independent management unit, or may be a function in any management unit (a network management unit, a network orchestration unit, a network management and orchestration unit, an element management unit, a network function management unit, a service management unit, a service orchestration unit, a domain management unit, a service management and orchestration unit, an NFVO, or the like). In addition, it should be further noted that the domain management unit may be included in an OSS, or may not be included in an OSS.

In the communications architecture shown in FIG. 1b:

The network slice management unit includes one or both of an end-to-end network management function and an end-to-end network orchestration function. Specifically, the network slice management unit may have some or all of the following functions:

end-to-end network management (such as network lifecycle management, network template management, network fault management, network performance management, and network configuration management); mapping between end-to-end networks, subnets, and network functions; coordination of network resources or sub-SLAs provided in different domains (such as an access network domain, a core network domain, and a transmission domain); decomposition of network requirement information into subnet requirement information; uniform orchestration of subnets provided in subdomains, so that network functions of the subnets provided in the different subdomains can satisfy a target service or network requirement (such as an SLA requirement, a KPI requirement, or a QoS requirement.

The network management unit has the following function:

management of end-to-end network resources (such as network functions, transmission resources, network elements, or air interface resources) (for example, deployment, configuration management, performance management, and fault management of the network resources).

The network slice subnet management unit includes one or both of a subnet management function and an orchestration function. Specifically, the network slice subnet management unit may have some or all of the following functions: domain management (including subnet lifecycle management (creation, update, and deletion), subnet fault management, subnet performance management, subnet configuration management, and the like); service management (including service lifecycle management, service fault management, service performance management, service configuration management, and the like); and coordination of network resources (for example, NFs or NEs).

The element management unit has the following function:

management of intra-domain network resources (for example, network functions, transmission resources, network elements, or air interface resources) (for example, deployment, configuration management, performance management, and fault management of the network resources).

In the embodiments of this application, after determining requirement information of a to-be-deployed network resource, the first device may send a network resource management request to the second device to deploy the to-be-deployed network resource, so that on-demand deployment is implemented, thereby helping improve a possibility of successful target network deployment, and also helps improve network resource utilization.

Figure 2:
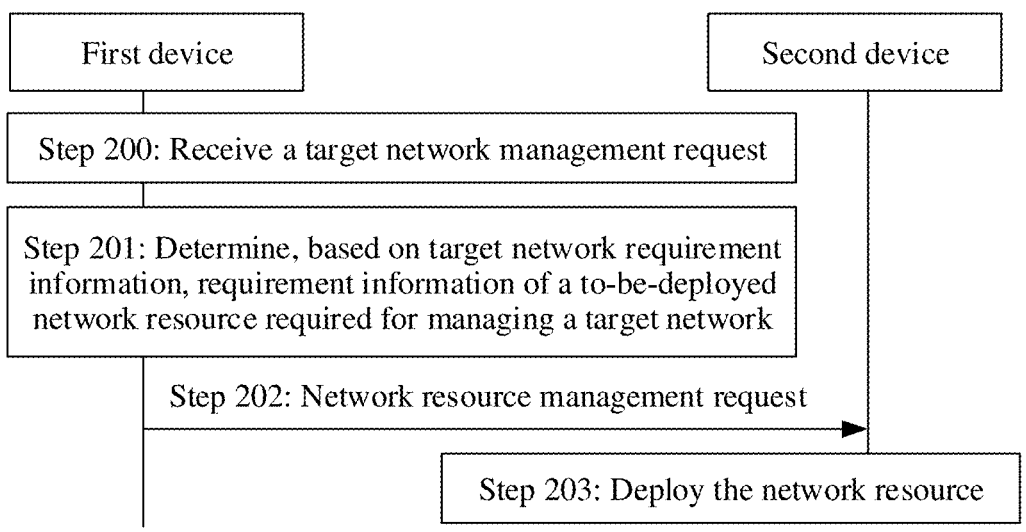
FIG. 2 is a schematic flowchart of a network resource deployment method according to an embodiment of this application.

As shown in FIG. 2, a network resource deployment method according to an embodiment of this application includes the following operations.

Operation 200: A first device receives a target network management request, where the target network management request includes target network requirement information.

The target network requirement information includes one or more of a latency requirement, a bandwidth requirement, a coverage requirement, a user quantity requirement (a capacity requirement), a mobility requirement, a throughput requirement, a reliability requirement, a deployment location requirement, an affinity/anti-affinity requirement, a success rate requirement, a traffic model, a network slice type requirement, and the like. Specifically, the latency requirement is a requirement on a response time of a network or network component, the latency requirement may be that a maximum latency does not exceed a preset threshold, and the maximum latency is a maximum response time of the network or network component. For example, if the maximum latency of the network or network component is required to be 10 ms, the maximum response time of the network or network component is expected to be 10 ms. The bandwidth requirement may be used to describe a bandwidth that the network or network component is required to provide. For example, a minimum bandwidth of the network or network component is required to be 10 M. The coverage requirement is used to describe a network coverage area, such as the Shanghai area, used by the network or network component. The user quantity requirement is used to describe a maximum quantity of users that the network or network component is required to bear. For example, if it is predicted that the network or network component would be accessed by 1 million users before deployment, the user quantity requirement is that a user quantity is greater than or equal to 1 million. The mobility requirement is used to describe a movement status of a terminal device that accesses the network or network component, for example, whether the terminal device moves or is fixed. The mobility requirement may further describe a movement rate of the terminal device that accesses the network or network component. The affinity/anti-affinity requirement is a deployment location relationship requirement between the network or network component and another network or network component. The success rate is used to describe a success rate of using the network or network component by the terminal device, and may include a report success rate and a delivery success rate. The throughput requirement describes a data forwarding capability of the network or network component, for example, 100 Mbit/s, indicating that the network or network component supports transmitting data of 100 Mbit within one second. The reliability requirement is used to indicate a capability of the network or network component in performing a function thereof or duration in which the network or network component operates continuously. The network slice type may be divided based on functions. For example, a network slice type may be one of the following: enhanced mobile broadband (eMBB), ultra-reliable and low-latency communication (URLLC), and massive machine type communication (mMTC). The traffic model is used to describe a service use status of UE that accesses the network. For example, a data transmission period is that the UE transmits one packet every day, and a size of the packet is 1 M.

Operation 201: The first device determines, based on the target network requirement information, requirement information of a to-be-deployed network resource required for managing a target network, where the requirement information of the to-be-deployed network resource includes at least one of air interface resource requirement information, user quantity requirement information, throughput requirement information, coverage requirement information, radio bearer (RB) requirement information, base station requirement information, network element device requirement information, and network function requirement information.

For example, the air interface resource requirement information is used to describe an air interface resource that needs to be provided by the target network or the network resource, an air interface represents an interface between a mobile phone or a wireless modem and a base station, and the air interface resource includes at least one of the following information: an uplink/downlink user plane cell throughput, an uplink/downlink control plane cell user quantity, uplink/downlink cell power, and a basic cell capability (such as a frequency channel number and a bandwidth). The user quantity requirement information is used to describe a quantity of users that need to be supported by the target network or the network resource for access, for example, 1 million users need to be supported in a particular area. The throughput requirement information is used to describe a throughput that needs to be provided by the target network or the network resource, and the throughput represents a capability of forwarding data between devices every second. The coverage requirement information is used to describe wireless coverage or a wireless coverage level required by the network or the network resource. For example, wireless coverage needs to be increased in a cell, or a coverage level of a cell needs to be improved. The RB requirement information is used to describe a quantity of radio bearers that need to be provided by the network or the network resource. The base station requirement information is used to describe a requirement of the target network on a base station, for example, a quantity of base stations that need to be deployed, a specification of the base station that needs to be deployed, a version of the base station that needs to be deployed, a performance indicator that needs to be satisfied by the base station that needs to be deployed, or a component (for example, a board) that needs to be added to an existing base station. The network element device requirement information is used to describe a requirement of the target network on a network device, and may be a quantity of network element devices that need to be deployed, a specification of the network element device that needs to be deployed, a version of the network element device that needs to be deployed, a performance indicator that needs to be satisfied by the network element device that needs to be deployed, a component (for example, a central processing unit (CPU)) that needs to be added to an existing device, or the like. The network function requirement information is used to describe requirement information of a network function required by the network, and may be a type of the network function (for example, an authentication management function (AMF), a session management function (SMF), or a policy management function (PMF)), a quantity of network functions, a specification of the network function, or the like. This is not limited in this embodiment of this application.

Operation 202: The first device sends a network resource management request to a second device, where the network resource management request includes requirement information of a to-be-deployed network resource.

Operation 203: After receiving the network resource management request sent by the first device, the second device deploys the to-be-deployed network resource.

It should be noted that, when the second device deploys the to-be-deployed network resource, if the second device needs to deploy a device resource such as a base station, a gateway, a board, or a CPU, the second device sends a network resource deployment notification, and the network resource deployment notification is used to prompt operation and maintenance personnel to deploy a network resource. Specifically, in this embodiment of this application, the network resource deployment notification sent by the second device may be presented to the operation and maintenance personnel by using the second device. For example, a message indicating that a network resource needs to be deployed is presented, or a network resource that needs to be deployed may be directly prompted. In addition, in this embodiment of this application, the network resource deployment notification sent by the second device may alternatively prompt the operation and maintenance personnel by making a sound by using the second device. A specific implementation form of the network resource deployment notification is not limited in this embodiment of this application.

In addition, when the second device deploys the to-be-deployed network resource, for example, an air interface resource such as a frequency channel number, a cell, or an uplink/downlink control plane user quantity; or a transmission resource such as a bandwidth, the second device may correspondingly configure the to-be-deployed network resource based on the requirement information of the to-be-deployed network resource, or instruct another device to perform corresponding configuration. This is not limited in this embodiment of this application.

It should be noted that the target network in this embodiment of this application may be a network slice or a network slice subnet. This is not limited in this embodiment of this application. Specifically, in this embodiment of this application, network slices are communication resources ensuring that a bearer service can meet an SLA requirement. Hard isolation or soft isolation may be performed on the communication resources based on different requirements. The hard isolation is also referred to as physical isolation, and the soft isolation is also referred to as logical isolation. For example, the network slice in this embodiment of this application may be a complete logical network, and is a combination of network functions and resources required for completing a service. For example, the network slice may be a conventional network or a dedicated network. The network slice in this embodiment of this application may alternatively be a subnet, for example, a network slice subnet. This is not limited in this embodiment of this application.

Names of the target network management request and the network resource management request are not limited in this embodiment of this application. For example, the target network management request may also be referred to as a target network creation request, a target network deployment request, a target network instantiation request, a target network negotiation request, or the like; and the network resource management request may also be referred to as a network resource deployment request, a network resource creation request, a network resource instantiation request, or the like.

Specifically, to facilitate determining of the requirement information of the to-be-deployed network resource required for managing the target network, in one embodiment, the first device determines, based on the target network requirement information, requirement information of one or more network resources required for managing the target network, and then determines the requirement information of the to-be-deployed network resource based on the requirement information of the one or more network resources required for managing the target network and instance information of a network resource already deployed in an existing network.

The requirement information of the one or more network resources required for managing the target network is used to indicate all network resources required for deploying the target network. The to-be-deployed network resource is used to indicate a network resource that is required for deploying the target network and that has not been deployed in the existing network. The instance information of the network resource already deployed in the existing network is used to indicate a status of the network resource already deployed in the existing network. Specifically, the network resource in this embodiment of this application may include an air interface resource (such as a frequency channel number, a cell, an uplink/downlink control plane user quantity, an uplink/downlink user plane cell RB, or uplink/downlink cell power), a device resource (such as a site, a network function instance, a network element, a board, a CPU, or a baseband device capability), a transmission resource (such as a common public radio interface (CPRI) bandwidth, or a backhaul interface bandwidth), and the like. Specifically, a backhaul interface is an interface for communication between a base station and a core network. In addition, the network resource in this embodiment of this application may further include a logical resource, for example, a throughput, coverage, and a user quantity bearing capability that are required by a specific cell. For example, the network function instance is an AMF, a session management function, or the like; the network element is a public data network gateway (PGW), an internet protocol multimedia subsystem (IMS), a serving gateway (SGW), a mobility management entity (MME), or the like; and the baseband device capability is a baseband processing unit BBP or the like.

For example, when the target network requirement information includes a traffic model and a quantity of users, the first device may determine, based on the traffic model and the quantity of users, one or more base stations required for managing the target network and a quantity of RBs that need to be provided by each base station. The base stations required for managing the target network and the quantity of RBs that need to be provided by each base station are the requirement information of the one or more network resources required for managing the target network.

In this embodiment of this application, the first device may obtain, in the following manner, the instance information of the network resource already deployed in the existing network. Details are as follows:

The first device sends a network resource query request to the second device, and the network resource query request includes the requirement information of the one or more network resources required for managing the target network. Then, after receiving the network resource query request, the second device sends a network resource query result to the first device, and the network resource query result includes the instance information of the network resource already deployed in the existing network. After receiving the network resource query result sent by the second device, the first device obtains, from the network resource query result, the instance information of the network resource already deployed in the existing network.

It should be noted that names of the network resource query request and the network resource query result are not limited in this embodiment of this application. For example, the network resource query request may also be referred to as a resource query request or the like, and the network resource query result may be referred to as a network resource query response.

In addition, in this embodiment of this application, after receiving the network resource query request sent by the first device, the second device may alternatively first determine whether the network resource already deployed in the existing network satisfies the requirement information of the one or more network resources required for managing the target network. If determining that the deployed network resource cannot satisfy the requirement information of the one or more network resources required for managing the target network, the second device sends the network resource query result to the first device, where the network resource query result includes the instance information of the network resource already deployed in the existing network; or if determining that the deployed network resource can satisfy the requirement information of the one or more network resources required for managing the target network, the second device reserves a network resource that corresponds to the target network and that is in the existing network, allocates a resource identifier to the network resource corresponding to the target network, and then sends the network resource query result to the first device, where the network resource query result includes the resource identifier.

Duration in which the second device reserves the network resource that corresponds to the target network and that is in the existing network may be set based on an actual situation. This is not limited in this embodiment of this application.

It should be noted that, in this embodiment of this application, the instance information of the network resource already deployed in the existing network may include some or all of the following information, and is not limited to the following information:

a network resource identifier, a quantity of users supported by the network resource, a throughput supported by the network resource, coverage supported by the network resource, a capacity of the network resource, and a quantity of RBs supported by the network resource.

For example, when the target network requirement information includes a traffic model and a quantity of users, the first device may determine, based on the traffic model and the quantity of users, that X RBs are required for managing the target network is X. If M base stations are already deployed in a specified area in the existing network, and each base station can provide N RBs, a quantity of to-be-deployed base stations is $(X-(M \times N))/N$, and a total quantity of to-be-deployed RBs is $(X-(M \times N))$, where X, M, and N are positive integers greater than 0. When $(X-(M \times N))$ is less than or equal to 0, an RB deployed in the existing network may satisfy the target network requirement information. When $(X-(M \times N))$ is greater than 0, an RB deployed in the existing network cannot satisfy the target network requirement information.

In this embodiment of this application, to help the first device determine whether the network resource is successfully deployed, after performing operation 203, the second device sends a network resource management notification to the first device. The network resource management notification includes at least one of indication information and instance information of the to-be-deployed network resource, and the indication information indicates whether the to-be-deployed network resource is successfully deployed.

It should be noted that the instance information of the to-be-deployed network resource may include information such as a to-be-deployed air interface resource, a to-be-deployed device resource, a to-be-deployed transmission resource, or a to-be-deployed logical resource, for example, a quantity of to-be-deployed base stations, a quantity of to-be-deployed RBs, or a throughput or coverage supported by the to-be-deployed network resource.

After receiving the network resource management notification sent by the second device, if determining that the to-be-deployed network resource is successfully deployed, the first device manages the target network; or if determining that the to-be-deployed network resource fails to be deployed, the first device returns a target network management request failure.

That the first device manages the target network may include, for example, forming the target network by using deployed network resources; or configuring the to-be-deployed network resource that has been deployed and a network resource that is required for deploying the target network and that is in the existing network.

It should be noted that the existing network in the embodiments of this application may be a mobile communications system such as a next radio (NR) system, a long term evolution (LTE) system, a long term evolution-advanced (LTE-A) system, or an enhanced long term evolution (eLTE) system; or may be a cellular system related to wireless fidelity (WiFi), worldwide interoperability for microwave access (WiMax), the 3rd generation partnership project (3GPP), or the like. This is not limited in the embodiments of this application.

Figure 3:
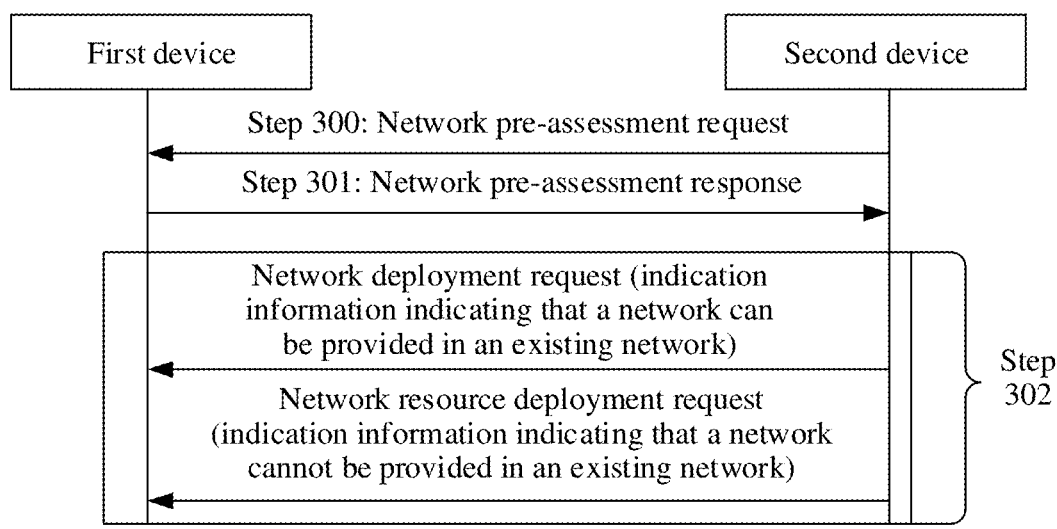
FIG. 3 is a schematic flowchart of a network resource assessment method according to an embodiment of this application.

In a process of automatically deploying a network slice, there may be a case in which a network resource already deployed in an existing network cannot satisfy a requirement of deploying the network slice. In this embodiment of this application, the network resource may further be assessed before the network slice is deployed. Specifically, as shown in FIG. 3, a network resource assessment method according to an embodiment of this application includes the following operations.

Operation 300: A second device sends a network pre-assessment request to a first device, where the network pre-assessment request includes network requirement information, and the network requirement information indicates a requirement satisfied by a network that needs to be deployed.

It should be noted that, in this embodiment of this application, the requirement satisfied by the network that needs to be deployed may include a service type, a latency, a throughput, a bandwidth, a quantity of users, user distribution, a user traffic model (for example, a data transmission period), a coverage area, and the like of the network. This is not limited in this embodiment of this application. It should be noted that the data transmission period is a data transmission period. For example, if a terminal device transmits data by using a network slice every N seconds, a data transmission period of the terminal device is N seconds, where N is a positive integer greater than 0.

Operation 301: After receiving the network pre-assessment request sent by the second device, the first device determines whether the network can be provided in an existing network, and then sends a network pre-assessment response to the second device, where the network pre-assessment response includes indication information, and the indication information indicates whether the network can be provided in the existing network.

In this embodiment of this application, after operation 301 is performed, operation 302 is performed.

Specifically, in operation 302, after receiving the network pre-assessment response sent by the first device, if determining that the indication information indicates that the network can be provided in the existing network, the second device sends a network deployment request to the first device; or if determining that the indication information indicates that the network cannot be provided in the existing network, the second device sends a network resource deployment request to the first device.

It should be noted that names of the network pre-assessment request and the network pre-assessment response are not limited in this embodiment of this application. For example, the network assessment request may also be referred to as a network slice pre-assessment request, a network slice subnet pre-assessment request, or the like.

In this embodiment of this application, if the indication information indicates that the network cannot be provided in the existing network, the network pre-assessment response may further include requirement information of a to-be-deployed network resource; and the requirement information of the to-be-deployed network resource includes at least one of air interface resource requirement information, user quantity requirement information, throughput requirement information, coverage requirement information, RB requirement information, base station requirement information, network element device requirement information, network function requirement information, and the like.

It should be noted that, the to-be-deployed network resource is a network resource that is not deployed in the existing network and that is required for deploying the network.

In this embodiment of this application, if the indication information indicates that the network can be provided in the existing network, after receiving the network pre-assessment response sent by the first device, the second device sends the network deployment request to the first device. The network deployment request is used to instruct to deploy the network.

Specifically, to facilitate deployment of the network, In one embodiment, if determining that the network can be provided in the existing network, the first device reserves a network resource corresponding to the network in the existing network, allocates a network resource identifier to the network resource, and then sends the network pre-assessment response to the second device. The network pre-assessment response includes the network resource identifier, and the network resource identifier is used to identify the network resource corresponding to the network in the existing network.

To help the first device deploy the network, in one embodiment, the network deployment request sent by the second device to the first device includes the network resource identifier.

It should be noted that, for a specific network that can be used as the existing network in this embodiment of this application, refer to an implementation of the existing network in the network resource deployment method shown in FIG. 2.

To facilitate understanding of the technical solutions in the embodiments of this application, this embodiment of this application may be applied to a network slice creation process. Specifically, the communications architecture shown in FIG. 1b is used as an example for detailed description.

Embodiment 1

Figure 4:
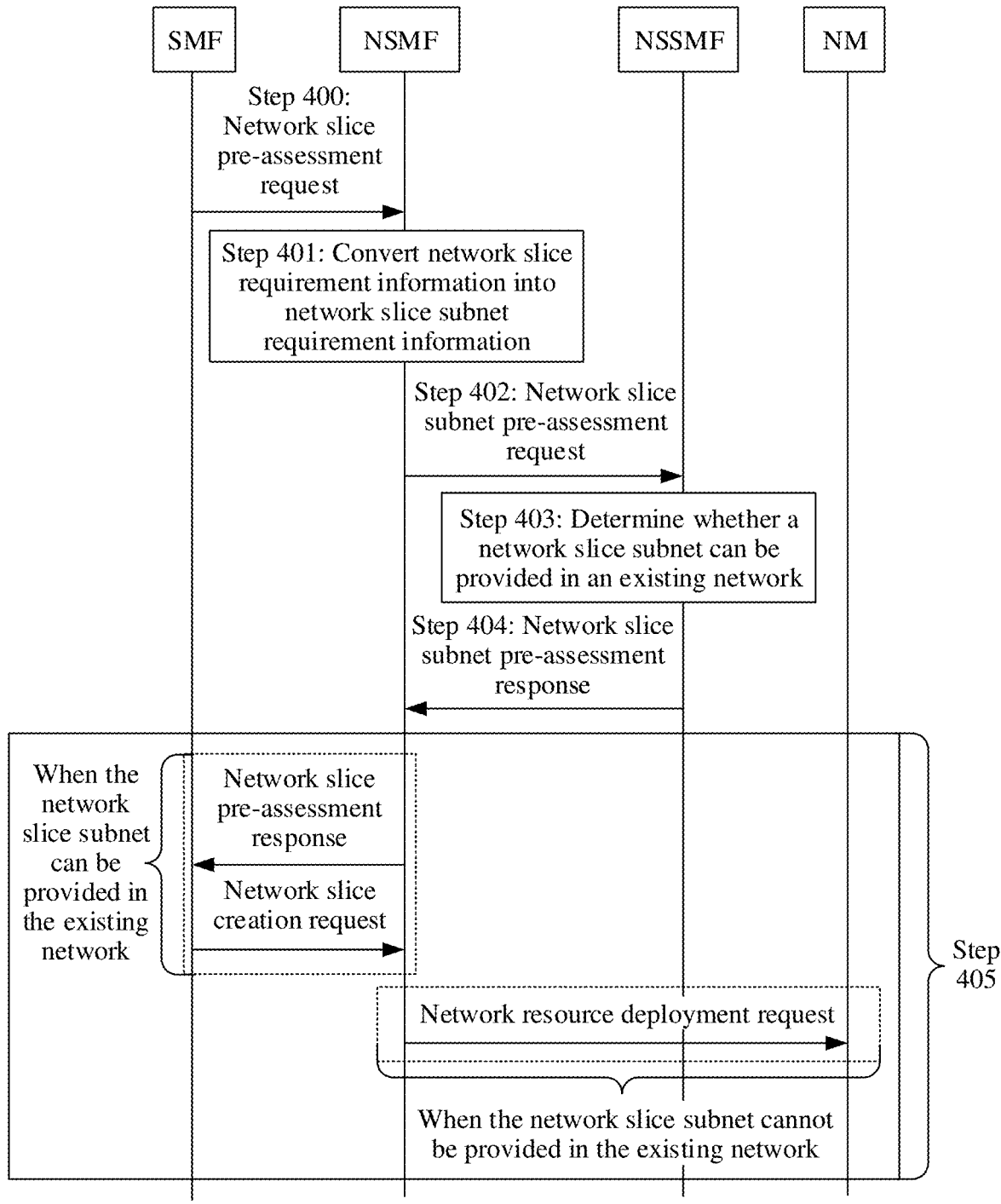
FIG. 4 is a schematic flowchart of a network resource assessment method according to an embodiment of this application.

As shown in FIG. 4, a network slice assessment method according to an embodiment of this application includes the following operations.

Operation 400: If an SMF needs to create a network slice to carry a service, the SMF sends a network slice pre-assessment request to an NSMF, where the network slice pre-assessment request includes network slice requirement information, and the network slice requirement information indicates a requirement satisfied by a network slice that needs to be deployed, for example, a requirement on a service/network slice type, a latency, a throughput, a bandwidth, a quantity of users, user distribution, a user traffic model (for example, a data transmission period), or a coverage area.

Operation 401: After receiving the network slice pre-assessment request sent by the SMF, the NSMF converts the network slice requirement information into network slice subnet requirement information, where the network slice subnet requirement information indicates a requirement satisfied by a subnet of the network slice that needs to be deployed.

Operation 402: The NSMF sends a network slice subnet pre-assessment request to the NSSMF, where the network slice subnet pre-assessment request includes the network slice subnet requirement information.

Operation 403: After receiving the network slice subnet requirement information sent by the NSMF, the NSSMF determines whether the network slice subnet can be provided in an existing network.

Specifically, an embodiment of this application in which the NSSMF determines whether the network slice subnet can be provided in the existing network is as follows: The NSSMF may convert the network slice subnet requirement information into network resource requirement information. The network resource requirement information is used to indicate a network resource required for creating the network slice subnet. Then, the NSSMF determines whether a network resource already deployed in the existing network satisfies the network resource required for creating the network slice subnet. The network resource includes an air interface resource (for example, a frequency channel number, an uplink/downlink control plane cell user quantity, an uplink/downlink user plane cell PRB, or uplink/downlink cell power), a device resource (for example, a site, a network function instance, a network element, a board, a CPU, or a baseband device capability), and a transmission resource (for example, a CPRI interface bandwidth or a backhaul interface bandwidth). In addition, the network resource further includes a logical resource, for example, a throughput, coverage, and a user quantity bearing capability that are required by a specific cell.

For example, if a quantity of base stations already deployed in a specified area in the existing network is M, and a quantity of RBs that can be provided by each base station is N, a total quantity of RBs that can be provided in the existing network is M×N. It is assumed that a total quantity of RBs required for deploying the network slice subnet that is obtained through calculation based on a traffic model and a quantity of users that are included in the network resource requirement information is X; and if M×N is greater than or equal to X, the network resource already deployed in the existing network can satisfy the network resource required for deploying the network slice subnet; or if M×N is less than X, the network resource already deployed in the existing network cannot satisfy the network resource required for deploying the network slice subnet. For example, if each base station in the deployed network slice subnet can also provide N RBs, a quantity of to-be-deployed base stations is (X−(M×N))/N, where X, M, and N are positive integers greater than 0.

Another embodiment is that whether the network slice subnet can be provided in one or more network slice subnets already deployed in the existing network is directly determined without converting the network slice subnet requirement information into the network resource requirement information.

It should be noted that an algorithm for determining whether the network slice subnet can be provided in the existing network may be preconfigured in the NSSMF.

Operation 404: The NSSMF sends a network slice subnet pre-assessment response to the NSMF.

The network slice subnet pre-assessment response includes indication information, and the indication information indicates whether the network slice subnet can be provided in the existing network.

Specifically, if the indication information indicates that the network slice subnet can be provided in the existing network, the NSSMF reserves a network resource corresponding to the network slice subnet in the existing network; then allocates a network resource identifier that is used to identify the network resource corresponding to the network slice subnet in the existing network; and adds the network resource identifier to the network slice subnet pre-assessment response sent to the NSMF.

If the indication information indicates that the network slice subnet cannot be provided in the existing network, in one embodiment, a reason why a network slice resource cannot be provided may further be added to the network slice subnet pre-assessment response, for example, a new physical site needs to be deployed, a board of a deployed physical site needs to be added, or a user quantity bearing capability or coverage of a specific cell needs to be increased.

Operation 405: After receiving the network slice subnet pre-assessment response sent by the NSSMF, the NSMF performs the following operations:

If determining that the network slice subnet can be provided in the existing network, the NSMF sends a network slice pre-assessment response to the SMF. The network slice pre-assessment response is used to indicate that the network slice can be provided in the existing network. After receiving the network slice pre-assessment response, the SMF sends a network slice creation request to the NSMF. In one embodiment, the network slice creation request includes the network resource identifier in operation 404, and the network resource identifier may be sent to the SMF by using the network slice pre-assessment response.

If the NSMF determines that the network slice subnet cannot be provided in the existing network, an embodiment is as follows: The NSMF adjusts a conversion manner of converting the network slice requirement information into the network slice subnet requirement information, converts the network slice requirement information into the network slice subnet requirement information in the adjusted conversion manner, and then performs operation 402 to operation 404 again. Another embodiment is as follows: The NSMF sends the network slice pre-assessment response to the SMF, where the network slice pre-assessment response is used to indicate that the network slice cannot be provided in the existing network, and then the SMF determines whether to adjust the network slice requirement information. Still another embodiment is as follows: The NSMF sends a network resource deployment request to an NM, where the network resource deployment request includes requirement information of a to-be-deployed network resource; and the NM deploys and configures the to-be-deployed network resource. Specifically, the NM instructs operation and maintenance personnel to deploy the network resource, and instructs an EM to configure the network resource. FIG. 4 shows only this embodiment, and other embodiments are not shown in the accompanying drawings.

In this embodiment of this application, the NSSMF is equivalent to the first device in the network resource assessment method shown in FIG. 3 in the embodiment of this application, and the NSMF is equivalent to the second device in the network resource assessment method shown in FIG. 3 in the embodiment of this application.

Embodiment 2

Figure 5:
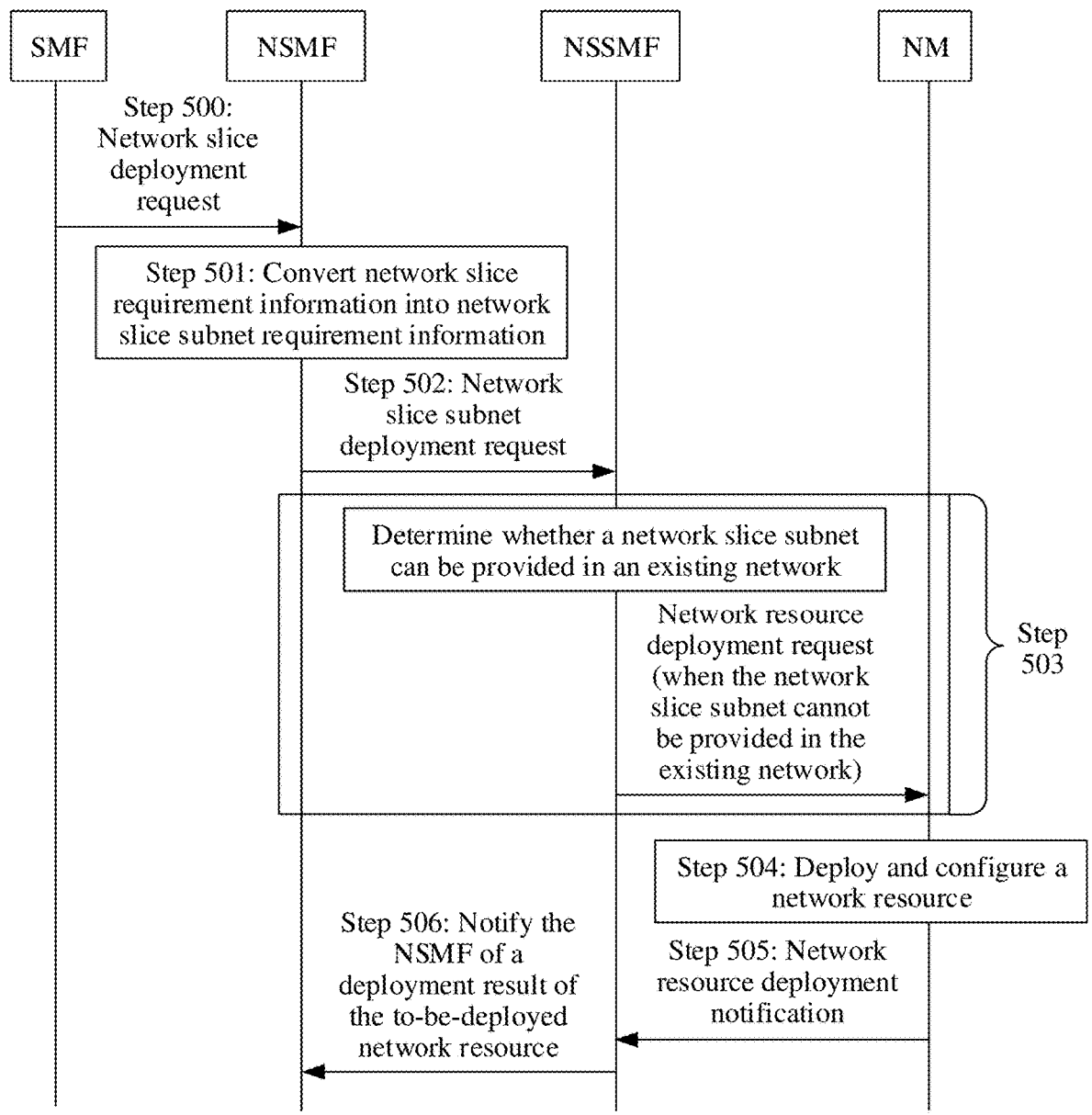
FIG. 5 is a schematic flowchart of a network resource deployment method according to an embodiment of this application.

As shown in FIG. 5, a network slice deployment method according to an embodiment of this application includes the following operations.

Operation 500: If an SMF needs to create a network slice to carry a service, the SMF sends a network slice deployment request to an NSMF, where the network slice deployment request includes network slice requirement information, and the network slice requirement information indicates a requirement satisfied by a network slice that needs to be deployed, for example, a requirement on a service/network slice type, a latency, a throughput, a bandwidth, a quantity of users, user distribution, a user traffic model (for example, a data transmission period), or a coverage area.

Operation 501: After receiving the network slice deployment request sent by the SMF, the NSMF converts the network slice requirement information into network slice subnet requirement information, where the network slice subnet requirement information indicates a requirement satisfied by a subnet of the network slice that needs to be deployed.

Operation 502: The NSMF sends a network slice subnet deployment request to an NSSMF, where the network slice subnet deployment request includes the network slice subnet requirement information.

Operation 503: After receiving the network slice subnet deployment request sent by the NSMF, the NSSMF determines whether the network slice subnet can be provided in an existing network. A determining manner may be similar to that in operation 403, and details are not described herein again.

If determining that the network slice subnet cannot be provided in the existing network, the NSSMF determines requirement information of a to-be-deployed network resource based on the network slice subnet requirement information. The requirement information of the to-be-deployed network resource includes at least one of air interface resource requirement information, user quantity requirement information, throughput requirement information, coverage requirement information, radio bearer RB requirement information, base station requirement information, network element device requirement information, and network function requirement information. Then, the NSSMF sends a network resource deployment request to an NM. The network resource deployment request includes the requirement information of the to-be-deployed network resource, for example, a network resource needs to be newly added, for example, a new physical site needs to be deployed, a board of a deployed physical site needs to be added, or a user quantity bearing capability or coverage of a specific cell needs to be increased.

Operation 504: After receiving the network resource deployment request sent by the NSSMF, the NM deploys and configures the network resource based on the requirement information of the to-be-deployed network resource. Specifically, an implementation of deploying and configuring the network resource by the NM may be as follows:

The NM instructs corresponding operation and maintenance personnel to deploy the to-be-deployed network resource, and requests an EM to configure the to-be-deployed network resource. Alternatively, the NM sends the network resource deployment request to an EM, and the EM deploys and configures the to-be-deployed network resource.

Operation 505: After determining that the to-be-deployed network resource is successfully deployed and configured, the NM reserves the network resource; allocates a network resource identifier to the network resource, to uniquely identify the network resource, and sends a network resource deployment notification to the NSSMF, where the network resource deployment notification includes the network resource identifier and indication information, and the indication information is used to indicate that the to-be-deployed network resource is successfully deployed.

Operation 506: After receiving the network resource deployment notification, the NSSMF notifies the NSMF of a deployment result of the to-be-deployed network resource.

In this embodiment of this application, the NSSMF is equivalent to the first device in the network resource deployment method shown in FIG. 2 in the embodiment of this application, and the NM is equivalent to the second device in the network resource assessment method shown in FIG. 2 in the embodiment of this application.

Introduction of a network resource deployment operation between the NSSMF and the NM helps increase a speed of deploying a network resource by the NSSMF in a network slice deployment process.

Embodiment 3

Figure 6:
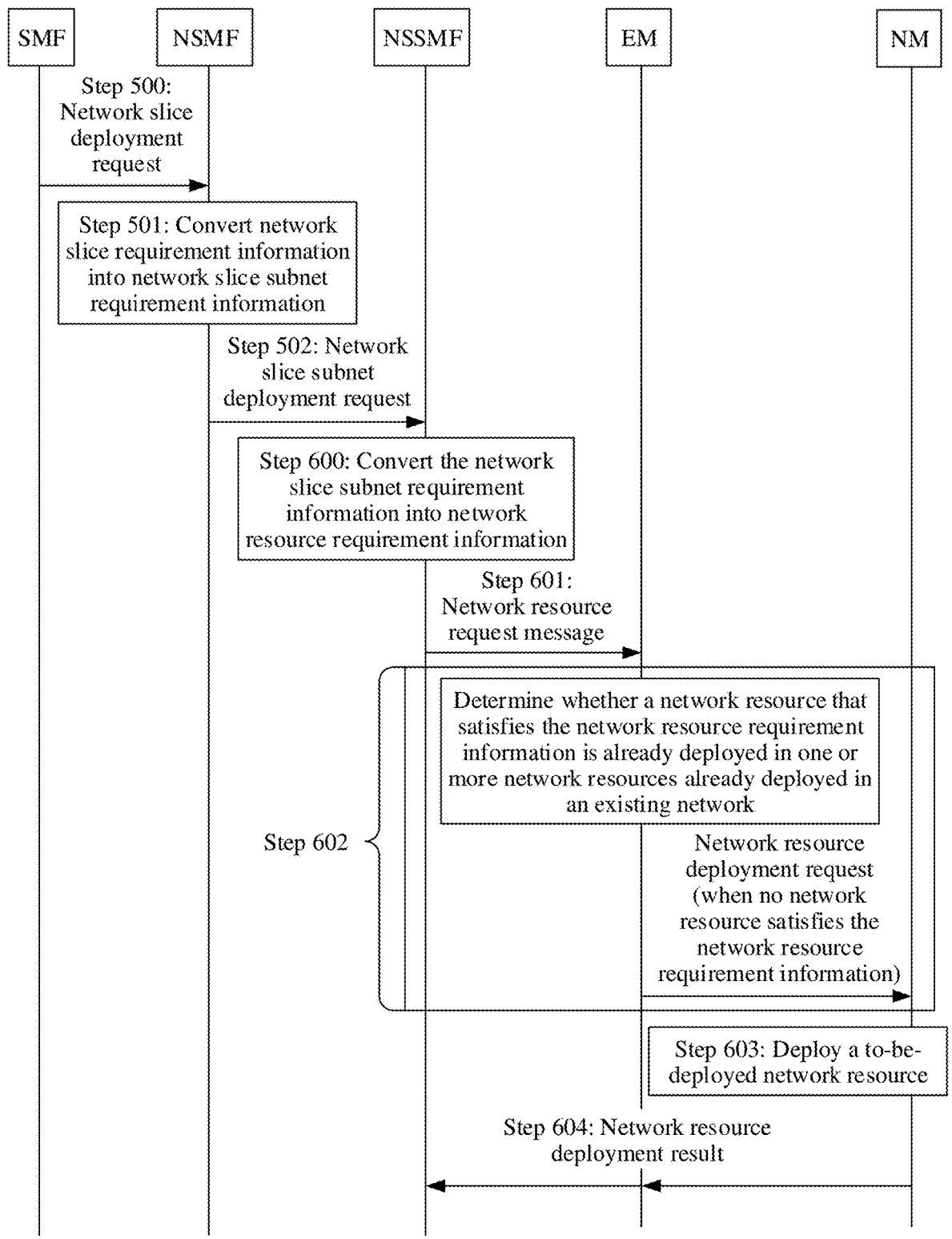
FIG. 6 is a schematic flowchart of a network resource deployment method according to an embodiment of this application.

As shown in FIG. 6, a network resource deployment method according to an embodiment of this application includes the following operations.

After operation 500 to operation 502 are performed, operation 600 to operation 604 are performed.

Operation 600: After receiving the network slice subnet deployment request sent by the NSMF, the NSSMF converts the network slice subnet requirement information into network resource requirement information, where the network resource includes an air interface resource (for example, a frequency channel number, an uplink/downlink control plane cell user quantity, an uplink/downlink cell user plane PRB, or uplink/downlink cell power), a device resource (for example, a site, a network function instance, a network element, a board, a CPU, or a baseband device capability), and a transmission resource (for example, a CPRI interface bandwidth or a backhaul interface bandwidth); in addition, the network resource further includes a logical resource, for example, a throughput, coverage, and a user quantity bearing capability that are required by a specific cell.

Operation 601: The NSSMF sends a network resource request message to an EM, where the network resource request message includes the network resource requirement information.

Operation 602: After receiving the network resource request message, the EM determines, based on the network resource requirement information, whether a network resource that satisfies the network resource requirement information is already deployed in one or more network resources already deployed in the existing network; and if the EM determines that the one or more network resources already deployed in the existing network include only some network resources or no network resource satisfying the network resource requirement information, one embodiment is that the EM sends a network resource deployment request to an NM, where the network resource deployment request includes requirement information of a to-be-deployed network resource; and then operation 603 and operation 604 are performed; and another embodiment is that the EM deploys the to-be-deployed network resource, and then returns a network resource deployment result to the NSSMF.

Operation 603: After receiving the network resource deployment request sent by the EM, the NM deploys the to-be-deployed network resource.

Operation 604: The NM returns the network resource deployment result to the NSSMF by using the EM.

In this embodiment of this application, the EM is equivalent to the first device in the network resource deployment method shown in FIG. 2 in the embodiment of this application, and the NM is equivalent to the second device in the network resource assessment method shown in FIG. 2 in the embodiment of this application.

Deployment of the network resource in this embodiment of this application is implemented by the EM, so that a function of the NSSMF is simplified, and centralized management of the network resource is facilitated.

Embodiment 4

Figure 7:
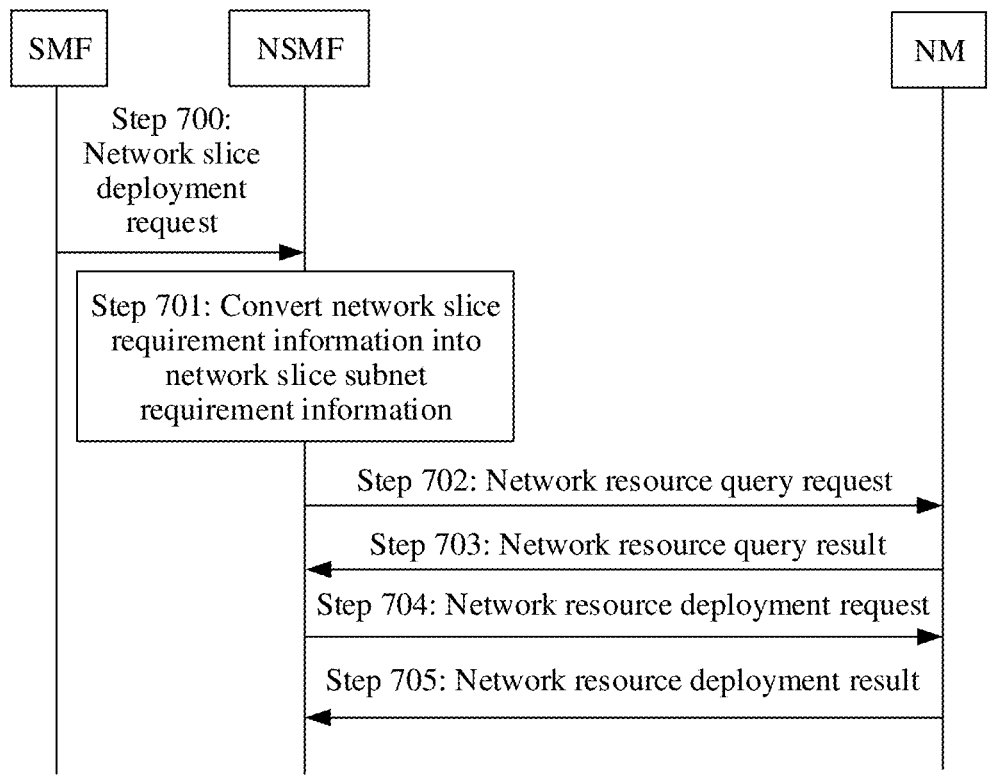
FIG. 7 is a schematic flowchart of a network resource deployment method according to an embodiment of this application.

As shown in FIG. 7, a network resource deployment method according to an embodiment of this application includes the following operations.

Operation 700: If an SMF needs to create a network slice to carry a service, the SMF sends a network slice deployment request to an NSMF, where the network slice deployment request includes network slice requirement information, and the network slice requirement information indicates a requirement satisfied by a network slice that needs to be deployed, for example, a requirement on a service/network slice type, a latency, a throughput, a bandwidth, a quantity of users, user distribution, a user traffic model (for example, a data transmission period), or a coverage area.

Operation 701: After receiving the network slice deployment request sent by the SMF, the NSMF converts the network slice requirement information into network resource requirement information. Specifically, the NSMF may directly convert the network slice requirement information into the network resource requirement information based on a locally preset algorithm; or the NSW may convert the network slice requirement information into the network slice subnet requirement information and then send the network slice subnet requirement information to an NSSMF, after converting the network slice subnet requirement information into the network resource requirement information, the NSSMF returns the network resource requirement information to the NSMF.

Operation 702: The NSMF sends a network resource query request to an NM, where the network resource query request includes the network resource requirement information.

Operation 703: After receiving the network resource query request sent by the NSMF, the NM queries whether a network resource that satisfies the network resource requirement information can be provided in one or more network resources already deployed in an existing network, and then sends a network resource query result to the NSMF.

Operation 704: After receiving the network resource query result sent by the NM, if determining that the network resource that satisfies the network resource requirement information cannot be provided in the one or more network resources already deployed in the existing network, the NSMF sends a network resource deployment request to the NM, where the network resource deployment request includes requirement information of a to-be-deployed network resource.

Operation 705: After receiving the network resource deployment request, the NM deploys the to-be-deployed network resource, and then returns a network resource deployment result to the NSMF.

In addition, when determining that the network resource that satisfies the network resource requirement information can be provided in the one or more network resources already deployed in the existing network, the NSMF sends a network slice creation request to the NM.

This embodiment of this application helps simplify a procedure of deploying the network resource.

In this embodiment of this application, the NSMF is equivalent to the first device in the network resource deployment method shown in FIG. 2 in the embodiment of this application, and the NM is equivalent to the second device in the network resource assessment method shown in FIG. 2 in the embodiment of this application.

Based on a same concept, an embodiment of this application further provides a first device for network resource deployment. The first device is configured to perform an action or a function of the first device in the network resource deployment method shown in FIG. 2.

Based on a same concept, an embodiment of this application further provides a first device for network resource assessment. The first device is configured to perform an action or a function of the first device in the network resource assessment method shown in FIG. 3.

In addition, an embodiment of this application further provides a communications system.

For brevity, for content of an apparatus part, specifically refer to the method embodiments, and repetitions are not provided again.

Figure 8A:
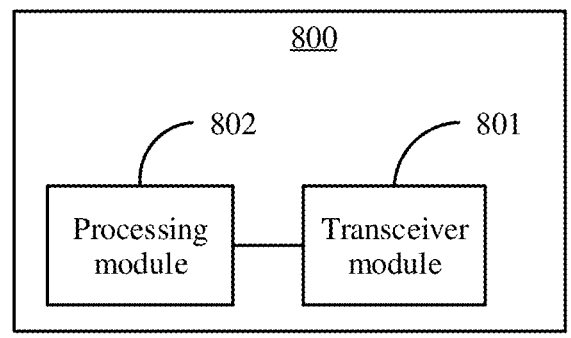
FIG. 8a and FIG. 8b are each a schematic structural diagram of a first device for network resource deployment according to an embodiment of this application.

As shown in FIG. 8a, a first device 800 for network resource deployment according to an embodiment of this application includes a transceiver module 801 and a processing module 802. The transceiver module 801 is configured to receive a target network management request, and the target network management request includes target network requirement information. The processing module 802 is configured to determine, based on the target network requirement information, requirement information of a to-be-deployed network resource required for managing a target network; and the requirement information of the to-be-deployed network resource includes at least one of air interface resource requirement information, user quantity requirement information, throughput requirement information, coverage requirement information, radio bearer RB requirement information, base station requirement information, network element device requirement information, and network function requirement information. The transceiver module 801 is further configured to send a network resource management request to a second device, and the network resource management request includes the requirement information of the to-be-deployed network resource.

In one embodiment, the processing module 802 is specifically configured to: determine, based on the target network requirement information, requirement information of one or more network resources required for managing the target network; and determine the requirement information of the to-be-deployed network resource based on the requirement information of the one or more network resources required for managing the target network and instance information of a network resource already deployed in an existing network.

In one embodiment, the transceiver module 801 is further configured to: send a network resource query request to the second device, where the network resource query request includes the requirement information of the one or more network resources required for managing the target network; and receive a network resource query result sent by the second device, where the network resource query result includes the instance information of the network resource already deployed in the existing network.

In one embodiment, the transceiver module 801 is further configured to receive a network resource management notification sent by the second device, and the network resource management notification includes at least one of indication information and instance information of the to-be-deployed network resource, and the indication information indicates whether the to-be-deployed network resource is successfully deployed. The processing module 802 is further configured to: if determining that the to-be-deployed network resource is successfully deployed, manage the target network; or if determining that the to-be-deployed network resource fails to be deployed, return a target network management request failure.

In one embodiment, the instance information of the network resource already deployed in the existing network includes at least one of a network resource identifier, a quantity of users supported by the network resource, a throughput supported by the network resource, coverage supported by the network resource, a capacity of the network resource, and a quantity of RBs supported by the network resource.

In one embodiment, the first device is a network slice management unit or a network slice subnet management unit; and the second device is a network management unit or an element management unit.

Figure 8B:
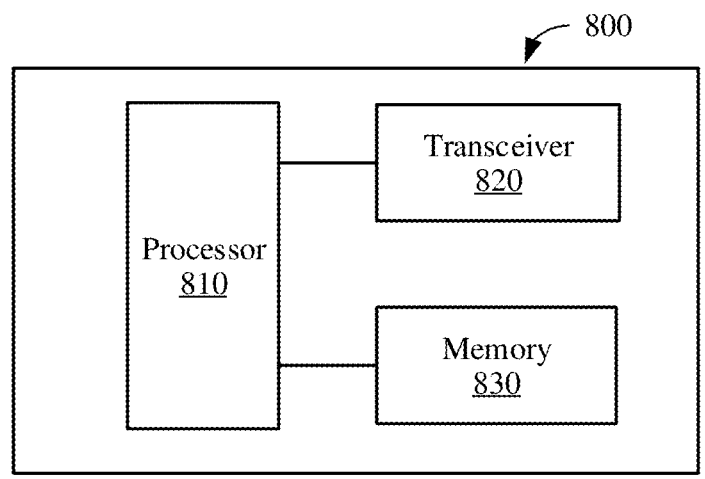

Specifically, a schematic diagram of a hardware structure of the first device 800 according to this embodiment of this application is shown in FIG. 8b, and the first device 800 includes a processor 810, a transceiver 820, and a memory 830. It should be noted that the processing module 802 corresponds to the processor 810 in the hardware structure of the first device 800, and the transceiver module 801 corresponds to the transceiver 820 in the hardware structure of the first device 800. The transceiver 820 includes a receiver and a transmitter. The memory 830 may be configured to store a program/code pre-installed when the first device 800 is delivered from a factory, or may store code executed by the processor 810, or the like.

The processor 810 may be a general-purpose CPU, a microprocessor, an application-specific integrated circuit (ASIC), or one or more integrated circuits, and is configured to perform a related operation, to implement the technical solutions provided in the embodiments of this application.

It should be noted that, although only the processor 810, the transceiver 820, and the memory 830 are shown in the hardware structure of the first device 800 shown in FIG. 8b, in one embodient, persons skilled in the art should understand that the first device 800 further includes another component essential for implementing normal running. In addition, based on a specific requirement, persons skilled in the art should understand that the first device 800 may further include hardware components for implementing other additional functions. In addition, persons skilled in the art should understand that the first device 800 may include only components or modules essential for implementing the embodiments of this application, but not necessarily include all the components shown in FIG. 8b.

A person of ordinary skill in the art may understand that all or some of the procedures of the methods in the foregoing embodiments may be implemented by a computer program instructing relevant hardware. The program may be stored in a computer-readable storage medium. When the program is executed, the procedures of the methods in the embodiments may be performed. The foregoing storage medium may be a magnetic disk, an optical disc, a read-only memory (ROM), a random access memory (RAM), or the like.

Figure 9A:
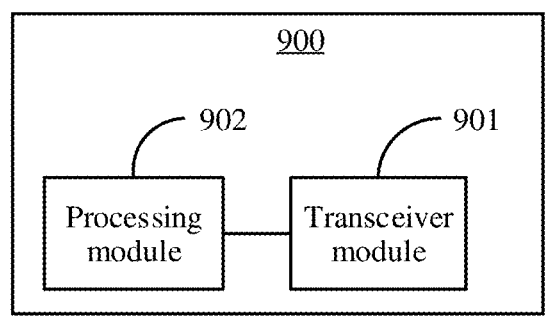
FIG. 9a and FIG. 9b are each a schematic structural diagram of a second device for network resource deployment according to an embodiment of this application.

As shown in FIG. 9a, a second device 900 for network resource deployment according to an embodiment of this application includes a processing module 902 and a transceiver module 901. The transceiver module 901 is configured to receive a network resource management request sent by a first device. The processing module 902 is configured to deploy a to-be-deployed network resource after the transceiver module 901 receives the network resource management request sent by the first device. The network resource management request includes requirement information of the to-be-deployed network resource; and the requirement information of the to-be-deployed network resource includes at least one of air interface resource requirement information, user quantity requirement information, throughput requirement information, coverage requirement information, radio bearer requirement information, base station requirement information, network element device requirement information, and network function requirement information.

In one embodiment, the transceiver module 901 is further configured to send a network resource management notification to the first device, and the network resource management notification includes at least one of indication information and instance information of the to-be-deployed network resource, and the indication information indicates whether the to-be-deployed network resource is successfully deployed.

In one embodiment, the transceiver module 901 is further configured to: after receiving a network resource query request sent by the first device, send a network resource query result to the first device. The network resource query request includes requirement information of one or more network resources required for managing a target network; and the network resource query result includes instance information of a network resource already deployed in an existing network.

Figure 9B:
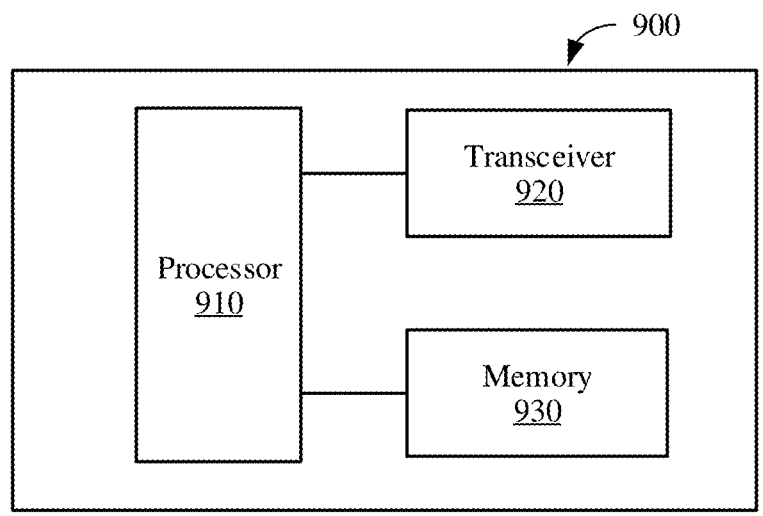

Specifically, a schematic diagram of a hardware structure of the second device 900 according to this embodiment of this application is shown in FIG. 9b, and the second device 900 includes a processor 910, a transceiver 920, and a memory 930. It should be noted that the processing module 902 corresponds to the processor 910 in the hardware structure of the second device 900, and the transceiver module 901 corresponds to the transceiver 920 in the hardware structure of the second device 900. The transceiver 920 includes a receiver and a transmitter. The memory 930 may be configured to store a program/code pre-installed when the second device 900 is delivered from a factory, or may store code executed by the processor 910, or the like.

The processor 910 may be a general-purpose CPU, a microprocessor, an ASIC, or one or more integrated circuits, and is configured to perform a related operation, to implement the technical solutions provided in the embodiments of this application.

It should be noted that, although only the processor 910, the transceiver 920, and the memory 930 are shown in the hardware structure of the second device 900 shown in FIG. 9b, in one embodiment, persons skilled in the art should understand that the second device 900 further includes another component essential for implementing normal running. In addition, based on a specific requirement, persons skilled in the art should understand that the second device 900 may further include hardware components for implementing other additional functions. In addition, persons skilled in the art should understand that the second device 900 may include only components or modules essential for implementing the embodiments of this application, but not necessarily include all the components shown in FIG. 9b.

A person of ordinary skill in the art may understand that all or some of the procedures of the methods in the foregoing embodiments may be implemented by a computer program instructing relevant hardware. The program may be stored in a computer-readable storage medium. When the program is executed, the procedures of the methods in the embodiments may be performed. The storage medium may be a magnetic disk, an optical disk, a ROM, a RAM, or the like.

Figure 10:
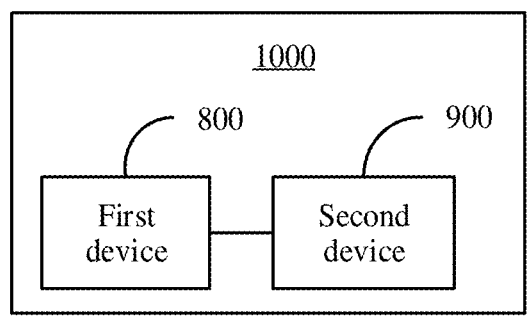
FIG. 10 is a schematic structural diagram of a communications system according to an embodiment of this application.

As shown in FIG. 10, a communications system 1000 according to an embodiment of this application includes the first device 800 and the second device 900.

Figure 11A:
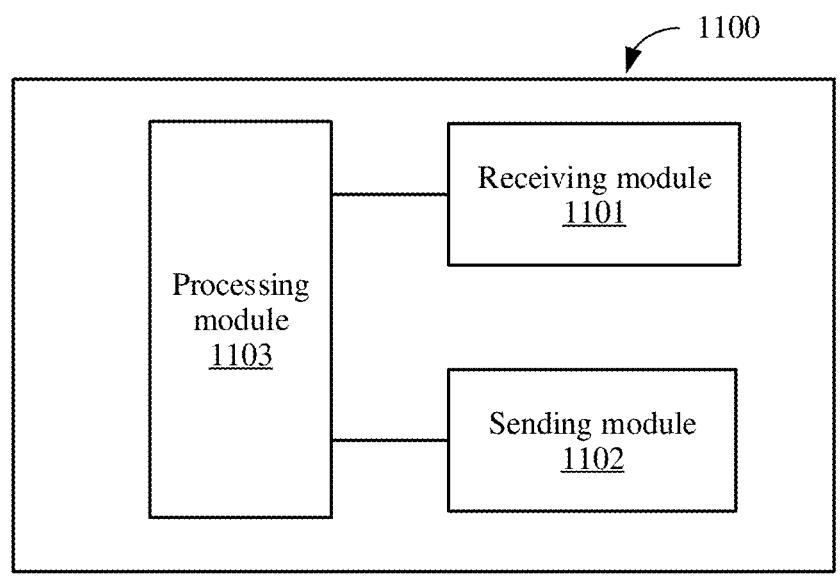
FIG. 11a and FIG. 11b are each a schematic structural diagram of a first device for network resource assessment according to an embodiment of this application.

As shown in FIG. 11a, a first device 1100 for network resource assessment according to an embodiment of this application includes a receiving module 1101 and a sending module 1102. The receiving module 1101 is configured to receive a network pre-assessment request sent by a second device, the network pre-assessment request includes network requirement information, and the network requirement information indicates a requirement satisfied by a network that needs to be deployed. The sending module 1102 is configured to send a network pre-assessment response to the second device, the network pre-assessment response includes indication information, and the indication information indicates whether the network can be provided in an existing network.

In one embodiment, the network pre-assessment response further includes requirement information of a to-be-deployed network resource; and the requirement information of the to-be-deployed network resource includes at least one of air interface resource requirement information, user quantity requirement information, throughput requirement information, coverage requirement information, radio bearer RB requirement information, base station requirement information, network element device requirement information, and network function requirement information.

In one embodiment, if the indication information indicates that the network can be provided in the existing network, the receiving module 1101 is further configured to: after the sending module 1102 sends the network pre-assessment response to the second device, receive a network deployment request sent by the second device, and the network deployment request is used to instruct to deploy the network.

In one embodiment, a processing module 1103 in the first device is configured to: before the sending module 1102 sends the network pre-assessment response to the second device, if determining that the network can be provided in the existing network, reserve a network resource corresponding to the network in the existing network.

In one embodiment, the network pre-assessment response further includes a network resource identifier, and the network resource identifier is used to identify the network resource corresponding to the network in the existing network.

In one embodiment, the network deployment request includes the network resource identifier.

Figure 11B:
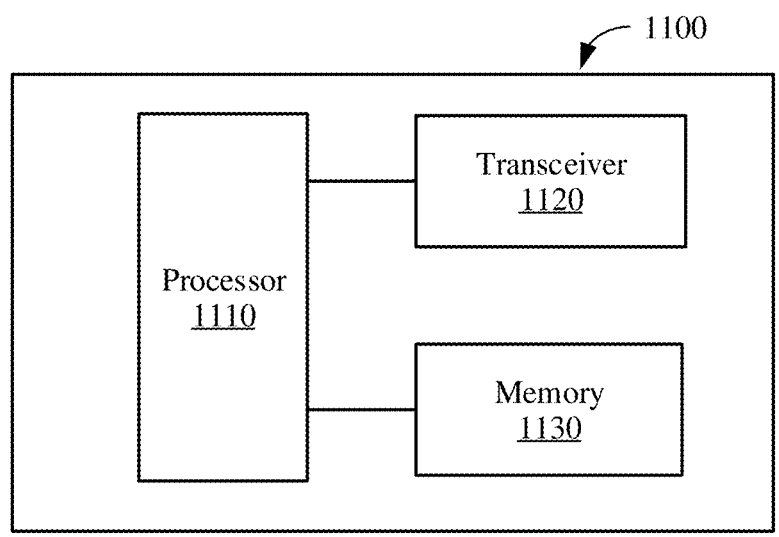

Specifically, a schematic diagram of a hardware structure of the first device 1100 according to this embodiment of this application is shown in FIG. 11b, and the first device 1100 includes a processor 1110, a transceiver 1120, and a memory 1130. It should be noted that the processing module 1103 corresponds to the processor 1110 in the hardware structure of the first device 1100, and the receiving module 1101 and the sending module 1102 correspond to the transceiver 1120 in the hardware structure of the first device 1100. The transceiver 1120 includes a receiver and a transmitter. The receiving module 1101 corresponds to the receiver, and the sending module 1102 corresponds to the transmitter. The memory 1130 may be configured to store a program/code pre-installed when the first device 1100 is delivered from a factory, or may store code executed by the processor 1110, or the like.

The processor 1110 may be a general-purpose CPU, a microprocessor, an ASIC, or one or more integrated circuits, and is configured to perform a related operation, to implement the technical solutions provided in the embodiments of this application.

It should be noted that, although only the processor 1110, the transceiver 1120, and the memory 1130 are shown in the hardware structure of the first device 100 shown in FIG. 11b, in one embodiment, persons skilled in the art should understand that the first device 1100 further includes another component essential for implementing normal running. In addition, based on a specific requirement, persons skilled in the art should understand that the first device 1100 may further include hardware components for implementing other additional functions. In addition, persons skilled in the art should understand that the first device 1100 may include only components or modules essential for implementing the embodiments of this application, but not necessarily include all the components shown in FIG. 11b.

A person of ordinary skill in the art may understand that all or some of the procedures of the methods in the foregoing embodiments may be implemented by a computer program instructing relevant hardware. The program may be stored in a computer-readable storage medium. When the program is executed, the procedures of the methods in the embodiments may be performed. The storage medium may be a magnetic disk, an optical disk, a ROM, a RAM, or the like.

Figure 12A:
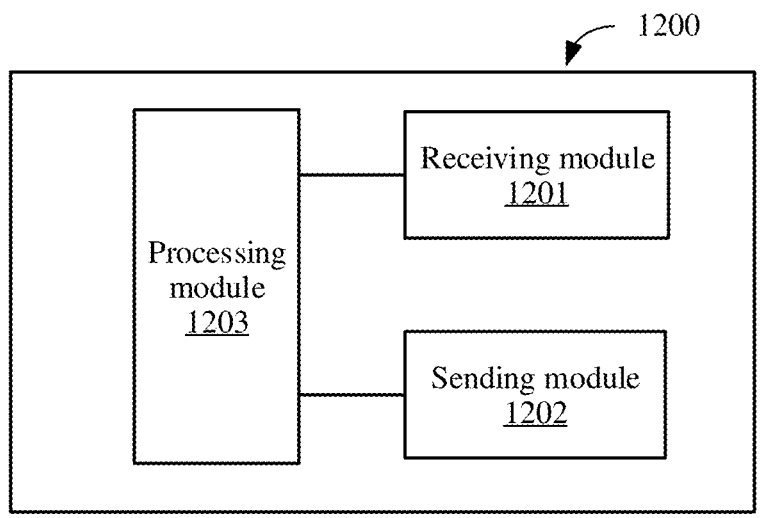
FIG. 12a and FIG. 12b are each a schematic structural diagram of a second device for network resource assessment according to an embodiment of this application.

As shown in FIG. 12a, a second device 1200 for network resource assessment according to an embodiment of this application includes a sending module 1202 and a receiving module 1201. The sending module 1202 is configured to send a network pre-assessment request to a first device. The receiving module 1201 is configured to: after the sending module 1202 sends the network pre-assessment request to the first device, receive a network pre-assessment response sent by the first network device. The network pre-assessment request includes network requirement information, and the network requirement information indicates a requirement satisfied by a network that needs to be deployed. The network pre-assessment response includes indication information, and the indication information indicates whether the network can be provided in an existing network.

In one embodiment, a processing module 1203 in the second device is further configured to: after the receiving module 1201 receives the network pre-assessment response sent by the first device, if determining that the indication information indicates that the network can be provided in the existing network, trigger the sending module 1202 to send a network deployment request to the first device; or if determining that the indication information indicates that the network cannot be provided in the existing network, trigger the sending module 1202 to send a network resource deployment request to the first device.

In one embodiment, the network pre-assessment response further includes requirement information of a to-be-deployed network resource; and the requirement information of the to-be-deployed network resource includes at least one of air interface resource requirement information, user quantity requirement information, throughput requirement information, coverage requirement information, radio bearer RB requirement information, base station requirement information, network element device requirement information, and network function requirement information. According to the foregoing technical solution, the second device can obtain the requirement information of the to-be-deployed network resource, thereby facilitating subsequent deployment of the to-be-deployed network resource.

Figure 12B:
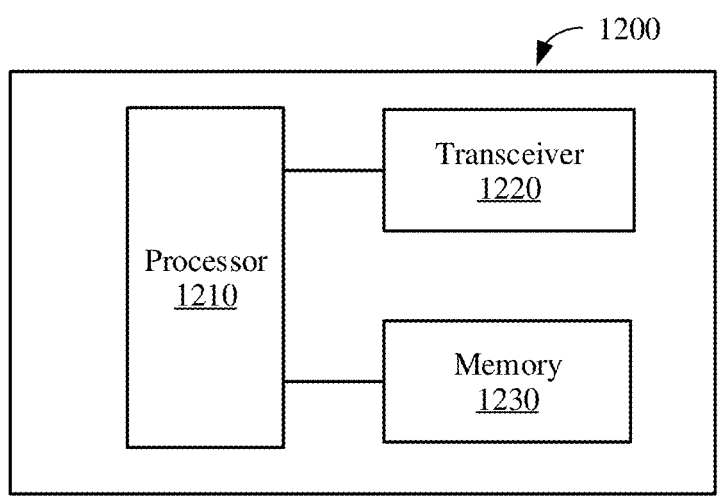

Specifically, a schematic diagram of a hardware structure of the second device 1200 according to this embodiment of this application is shown in FIG. 12b, and the second device 1200 includes a processor 1210, a transceiver 1220, and a memory 1230. It should be noted that the processing module 1203 corresponds to the processor 1210 in the hardware structure of the second device 1200, and the receiving module 1201 and the sending module 1202 correspond to the transceiver 1220 in the hardware structure of the second device 1200. The transceiver 1220 includes a receiver and a transmitter. The receiving module 1201 corresponds to the receiver, and the sending module 1202 corresponds to the transmitter. The memory 1230 may be configured to store a program/code pre-installed when the second device 1200 is delivered from a factory, or may store code executed by the processor 1210, or the like.

The processor 1210 may be a general-purpose CPU, a microprocessor, an ASIC, or one or more integrated circuits, and is configured to perform a related operation, to implement the technical solutions provided in the embodiments of this application.

It should be noted that, although only the processor 1210, the transceiver 1220, and the memory 1230 are shown in the hardware structure of the second device 1200 shown in FIG. 12b, in one embodiment, persons skilled in the art should understand that the second device 1200 further includes another component essential for implementing normal running. In addition, based on a specific requirement, persons skilled in the art should understand that the second device 1200 may further include hardware components for implementing other additional functions. In addition, persons skilled in the art should understand that the second device 1200 may include only components or modules essential for implementing the embodiments of this application, but not necessarily include all the components shown in FIG. 12b.

A person of ordinary skill in the art may understand that all or some of the procedures of the methods in the foregoing embodiments may be implemented by a computer program instructing relevant hardware. The program may be stored in a computer-readable storage medium. When the program is executed, the procedures of the methods in the embodiments may be performed. The storage medium may be a magnetic disk, an optical disk, a ROM, a RAM, or the like.

Figure 13:
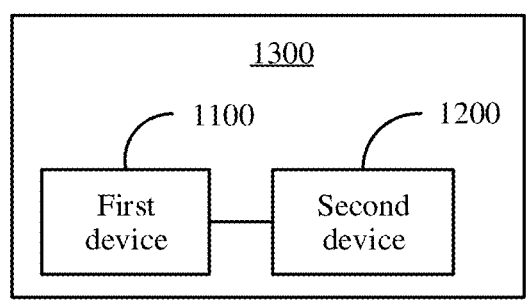
FIG. 13 is a schematic structural diagram of a communications system according to an embodiment of this application.

As shown in FIG. 13, a communications system 1300 according to an embodiment of this application includes the first device 1100 and the second device 1200.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each procedure and/or each block in the flowcharts and/or the block diagrams and a combination of a procedure and/or a block in the flowcharts and/or the block diagrams. These computer program instructions may be provided to a general-purpose computer, a special-purpose computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

These computer program instructions may be stored in a computer-readable memory that can instruct the computer or the another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may alternatively be loaded onto a computer or another programmable data processing device, so that a series of operations and operations are performed on the computer or the another programmable device, thereby generating computer-implemented processing. Therefore, the instructions executed on the computer or the another programmable device provide operations for implementing a specific function in one or more procedures in the flowcharts and/or in one or more blocks in the block diagrams.

Although some possible embodiments of this application have been described, persons skilled in the art can make changes and modifications to these embodiments once they learn the basic inventive concept. Therefore, the following claims are intended to be construed as to cover the embodiments of this application and all changes and modifications falling within the scope of this application.

Persons skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A network resource deployment method, comprising:
receiving, by a first device, a target network management request, wherein the target network management request comprises target network requirement information, wherein the target network requirement information comprises at least one of a latency requirement, a coverage requirement, a throughput requirement, or a reliability requirement;
determining, by the first device based on the target network requirement information, requirement information of a to-be-deployed network resource required for managing a target network, wherein the requirement information of the to-be-deployed network resource comprises at least one of air interface resource requirement information or radio bearer (RB) requirement information; and
sending, by the first device, a network resource management request to a second device, wherein the network resource management request comprises the requirement information of the to-be-deployed network resource.

2. The method according to claim 1, wherein the determining, by the first device, requirement information of a to-be-deployed network resource required for managing a target network comprises:
  determining, by the first device based on the target network requirement information, requirement information of one or more network resources required for managing the target network; and
  determining, by the first device, the requirement information of the to-be-deployed network resource based on the requirement information of the one or more network resources required for managing the target network and instance information of a network resource already deployed in an existing network.

3. The method according to claim 2, wherein the method further comprises:
  sending, by the first device, a network resource query request to the second device, wherein the network resource query request comprises the requirement information of the one or more network resources required for managing the target network; and
  receiving, by the first device, a network resource query result sent by the second device, wherein the network resource query result comprises the instance information of the network resource already deployed in the existing network.

4. The method according to claim 1, wherein the method further comprises:
  receiving, by the first device, a network resource management notification sent by the second device, wherein the network resource management notification comprises at least one of indication information and instance information of the to-be-deployed network resource, and the indication information indicates whether the to-be-deployed network resource is successfully deployed; and
  if determining that the to-be-deployed network resource is successfully deployed, managing, by the first device, the target network; or
  if determining that the to-be-deployed network resource fails to be deployed, returning, by the first device, a target network management request failure.

5. The method according to claim 2, wherein the instance information of the network resource already deployed in the existing network comprises at least one of a network resource identifier, a quantity of users supported by the network resource, a throughput supported by the network resource, coverage supported by the network resource, a capacity of the network resource, or a quantity of RBs supported by the network resource.

6. The method according to claim 1, wherein the first device is a network slice management unit or a network slice subnet management unit; and the second device is a network management unit or an element management unit.

7. The method according to claim 1, wherein the air interface resource requirement information is used to describe an air interface resource that needs to be provided by the target network or the to-be-deployed network resource.

8. The method according to claim 1, wherein the RB requirement information is used to describe a quantity of radio bearers that need to be provided by the target network or the to-be-deployed network resource.

9. The method according to claim 1, wherein the requirement information of the to-be-deployed network resource is used to deploy and configure the to-be-deployed network resource.

10. A first device for network resource deployment, comprising:
  a memory and at least one processor, wherein the memory is configured to store a program, and wherein the at least one processor is configured to invoke the program in the memory, wherein the program instructs the at least one processor to:
  receive a target network management request, wherein the target network management request comprises target network requirement information, wherein the target network requirement information comprises at least one of a latency requirement, a coverage requirement, a throughput requirement, or a reliability requirement;
  determine, based on the target network requirement information, requirement information of a to-be-deployed network resource required for managing a target network, wherein the requirement information of the to-be-deployed network resource comprises at least one of air interface resource requirement information, or radio bearer (RB) requirement information; and
  send a network resource management request to a second device, wherein the network resource management request comprises the requirement information of the to-be-deployed network resource.

11. The first device according to claim 10, wherein the at least one processor is further configured to:
  determine, based on the target network requirement information, requirement information of one or more network resources required for managing the target network; and determine the requirement information of the to-be-deployed network resource based on the requirement information of the one or more network resources required for managing the target network and instance information of a network resource already deployed in an existing network.

12. The first device according to claim 11, wherein the at least one processor is further configured to:
  send a network resource query request to the second device, wherein the network resource query request comprises the requirement information of the one or more network resources required for managing the target network; and receive a network resource query result sent by the second device, wherein the network resource query result comprises the instance information of the network resource already deployed in the existing network.

13. The first device according to claim 10, wherein the at least one processor is further configured to:
  receive a network resource management notification sent by the second device, wherein the network resource management notification comprises at least one of indication information and instance information of the to-be-deployed network resource, and the indication information indicates whether the to-be-deployed network resource is successfully deployed; and
  if determining that the to-be-deployed network resource is successfully deployed, manage the target network; or if determining that the to-be-deployed network resource fails to be deployed, return a target network management request failure.

14. The first device according to claim 11, wherein the instance information of the network resource already deployed in the existing network comprises at least one of a network resource identifier, a quantity of users supported by the network resource, a throughput supported by the network resource, coverage supported by the network resource, a capacity of the network resource, or a quantity of RBs supported by the network resource.

15. The first device according to claim 10, wherein the first device is a network slice management unit or a network slice subnet management unit; and the second device is a network management unit or an element management unit.

16. The first device according to claim 10, wherein the requirement information of the to-be-deployed network resource is used to deploy and configure the to-be-deployed network resource.

17. A system for deploying network resource comprising:
a first device configured to:
receive a target network management request, wherein the target network management request comprises target network requirement information, wherein the target network requirement information comprises at least one of a latency requirement, a coverage requirement, a throughput requirement, or a reliability requirement,
determine based on the target network requirement information, requirement information of a to-be-deployed network resource required for managing a target network, wherein the requirement information of the to-be-deployed network resource comprises at least one of air interface resource requirement information or radio bearer (RB) requirement information, and
send a network resource management request to a second device, wherein the network resource management request comprises the requirement information of the to-be-deployed network resource; and
a second device configured to obtain the requirement information of the to-be-deployed network resource.

18. The system according to claim 17, wherein,
the first device is configured to send a network resource query request to the second device, wherein the network resource query request comprises the requirement information of one or more network resources required for managing the target network; and
the second device is configured to send a network resource query result to the first device, wherein the network resource query result comprises instance information of the network resource already deployed in an existing network.

19. The system according to claim 17, wherein,
the second device is configured to send a network resource management notification to the first device, wherein the network resource management notification comprises at least one of indication information and instance information of the to-be-deployed network resource, and the indication information indicates whether the to-be-deployed network resource is successfully deployed; and
the first device is configured to manage the target network, if the to-be-deployed network resource is successfully deployed; or return a target network management request failure, if the to-be-deployed network resource fails to be deployed.

20. The system according to claim 17, wherein the requirement information of the to-be-deployed network resource is used to deploy and configure the to-be-deployed network resource.

21. The system according to claim 17, wherein the first device is a network slice management unit or a network slice subnet management unit; and the second device is a network management unit or an element management unit.

22. A non-transitory computer storage medium, wherein the computer storage medium is configured to store a program, which when executed by a processor, cause the processor to:
receive a target network management request, wherein the target network management request comprises target network requirement information, wherein the target network requirement information comprises at least one of a latency requirement, a coverage requirement, a throughput requirement, or a reliability requirement;
determine, based on the target network requirement information, requirement information of a to-be-deployed network resource required for managing a target network, wherein the requirement information of the to-be-deployed network resource comprises at least one of air interface resource requirement information, or radio bearer (RB) requirement information; and
send a network resource management request to a second device, wherein the network resource management request comprises the requirement information of the to-be-deployed network resource.

* * * * *